March 14, 1939.　　F. N. ROSS ET AL　　2,150,402
APPARATUS FOR MAKING ROLL-FORGED ARTICLES
Filed July 1, 1935　　26 Sheets-Sheet 1
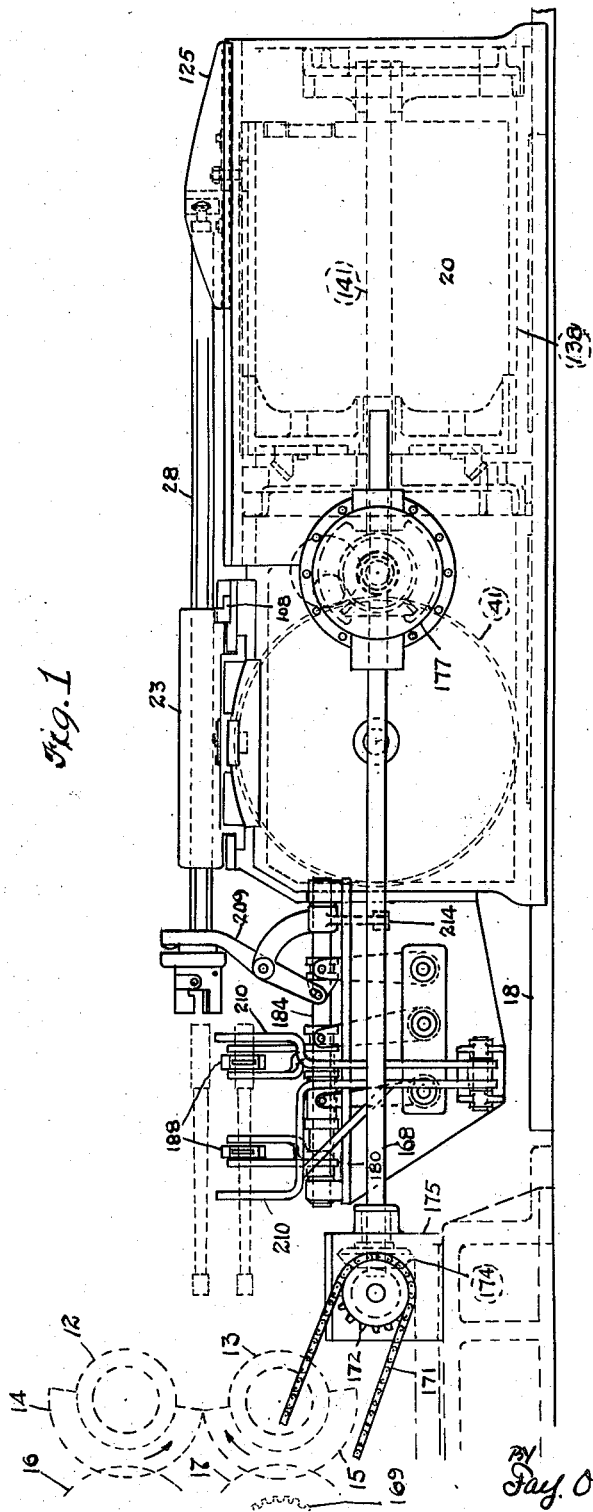
INVENTORS
Frederick N. Ross,
Floyd L. Scoutten and
John F. Ferm
By Fay, Oberlin & Fay ATTORNEYS

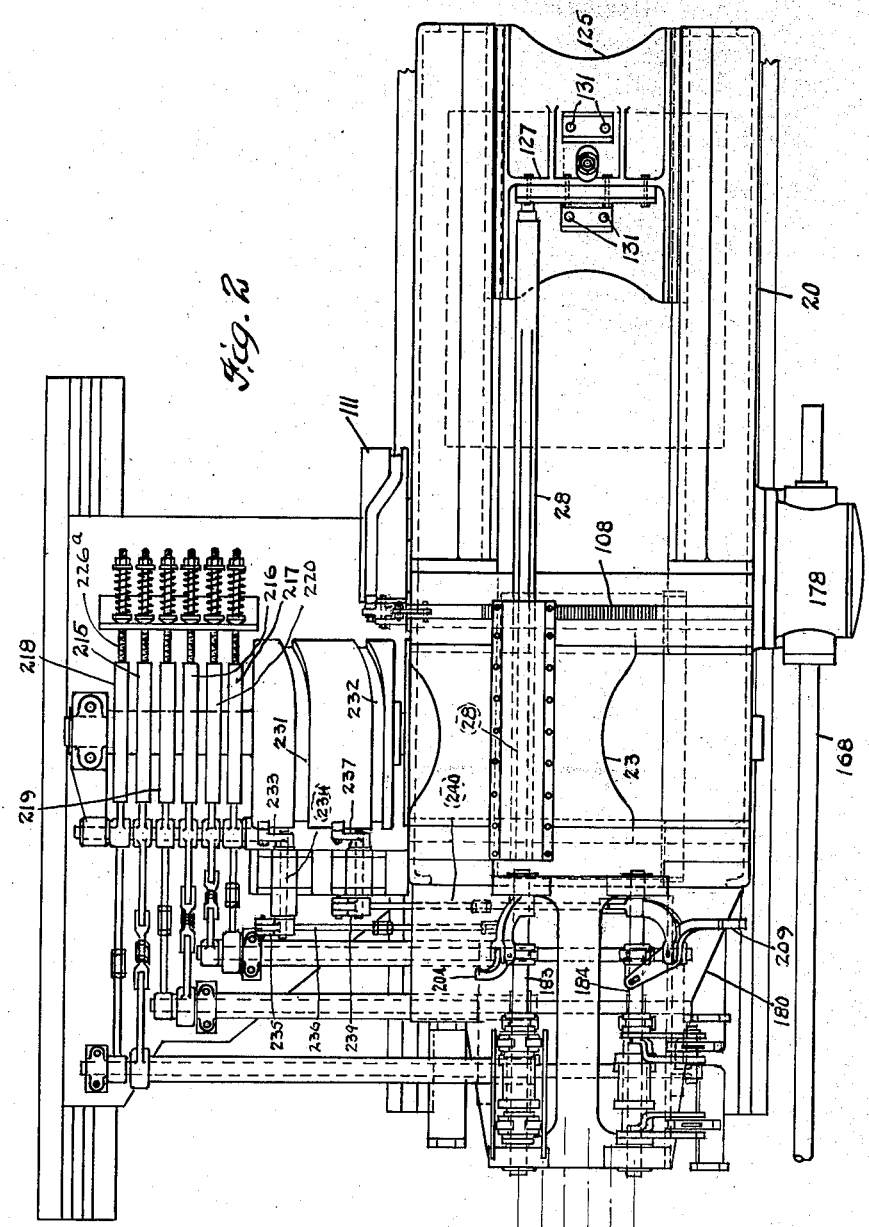

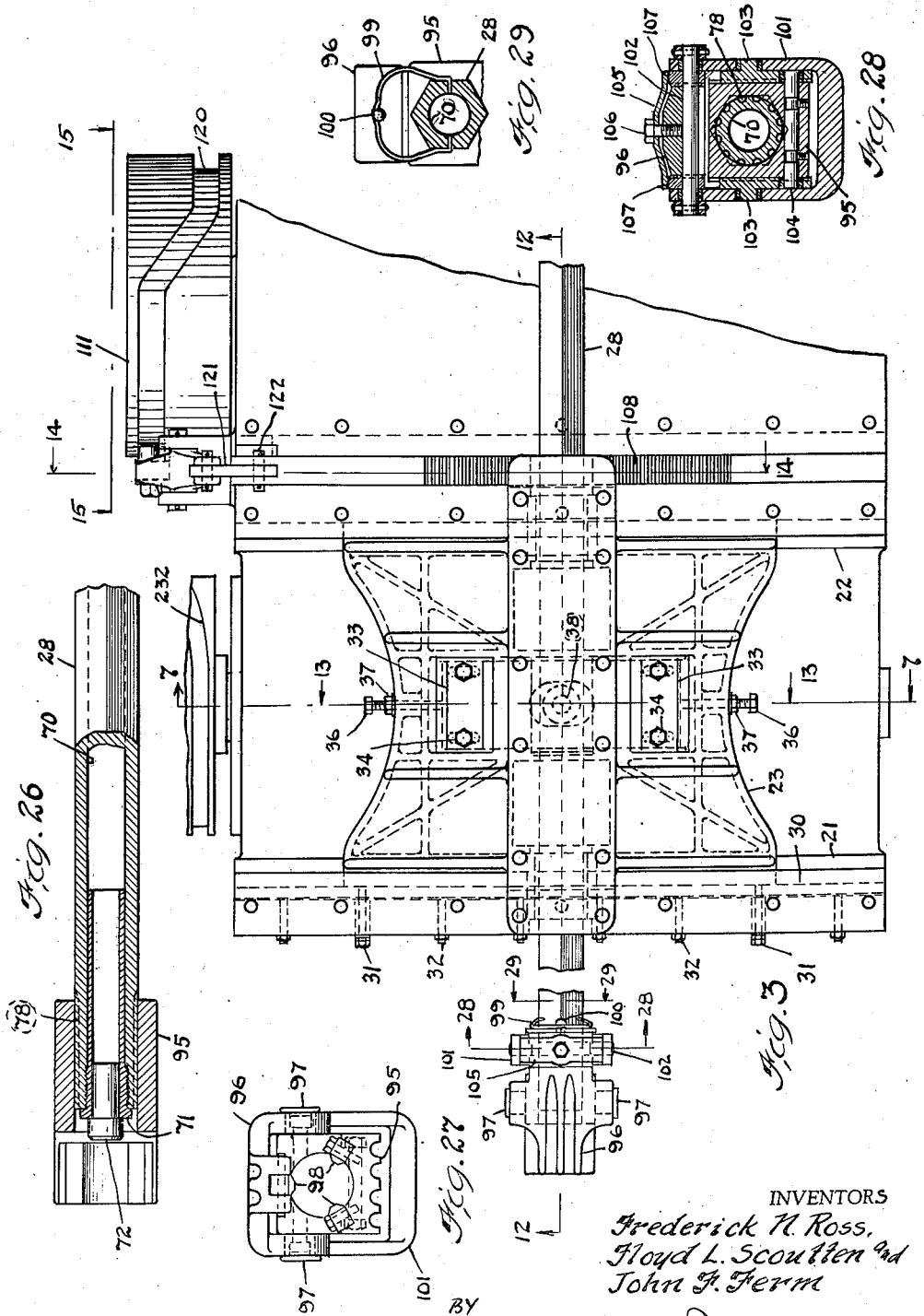

March 14, 1939. F. N. ROSS ET AL 2,150,402
APPARATUS FOR MAKING ROLL-FORGED ARTICLES
Filed July 1, 1935 26 Sheets-Sheet 4
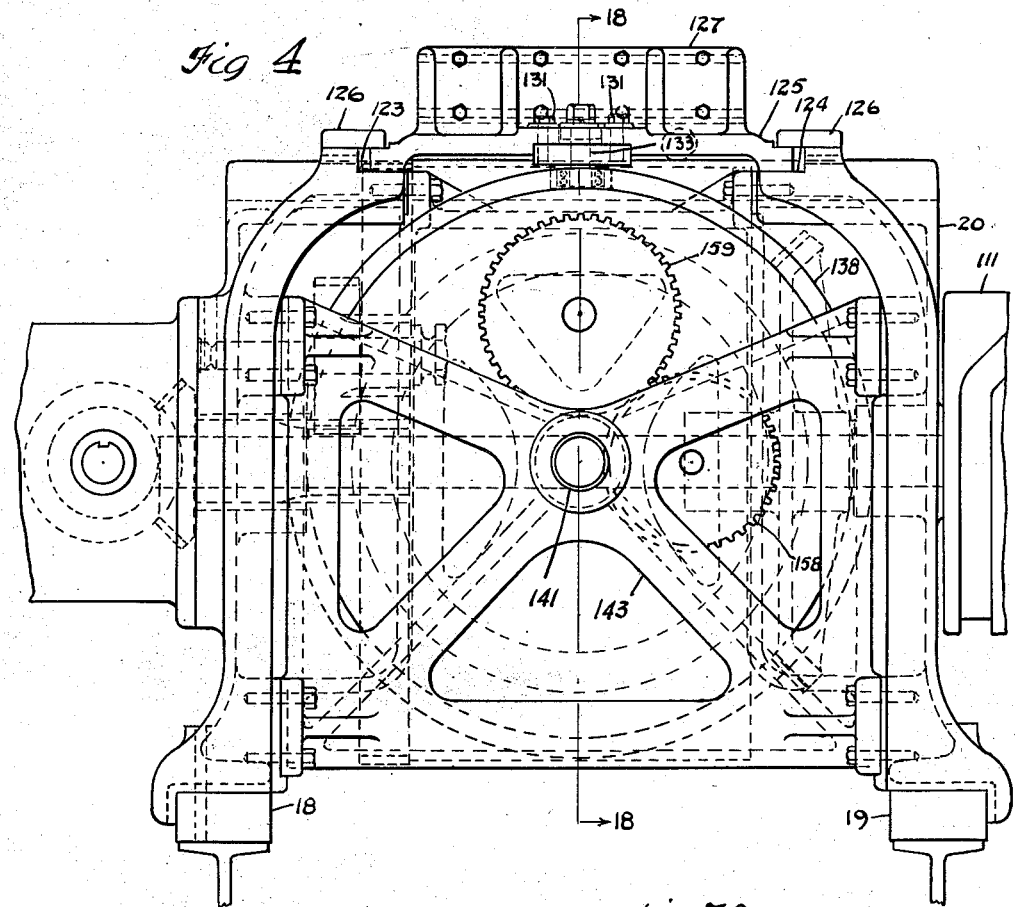
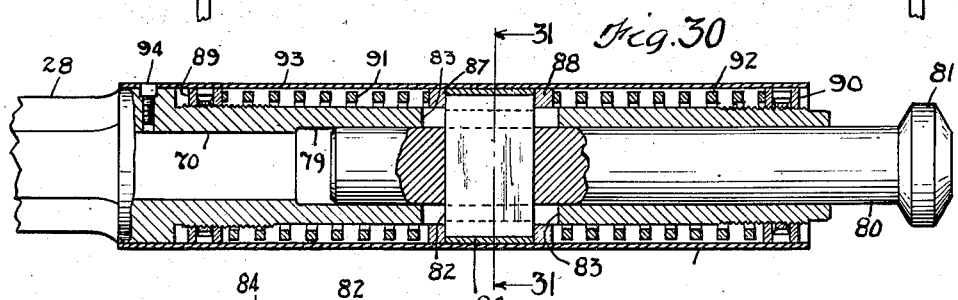
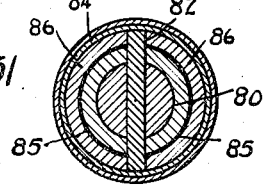
INVENTORS
Frederick N. Ross,
Floyd L. Scoutten and
John F. Ferm
BY
Fay, Oberlin & Fay ATTORNEYS

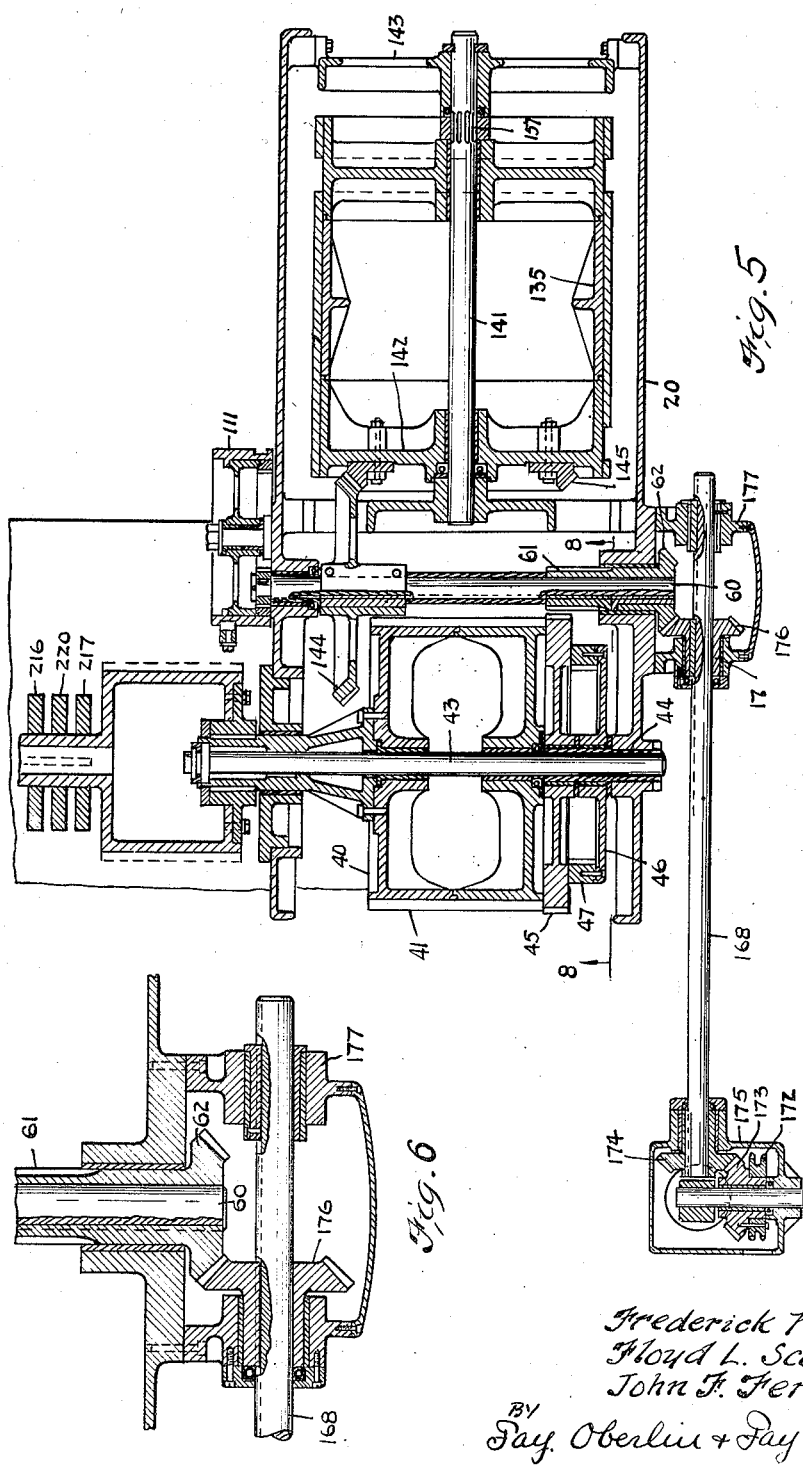

March 14, 1939.   F. N. ROSS ET AL   2,150,402
APPARATUS FOR MAKING ROLL-FORGED ARTICLES
Filed July 1, 1935   26 Sheets-Sheet 6

INVENTORS
Frederick N. Ross,
Floyd L. Scoutten and
John F. Ferm
BY Fay, Oberlin & Fay   ATTORNEYS

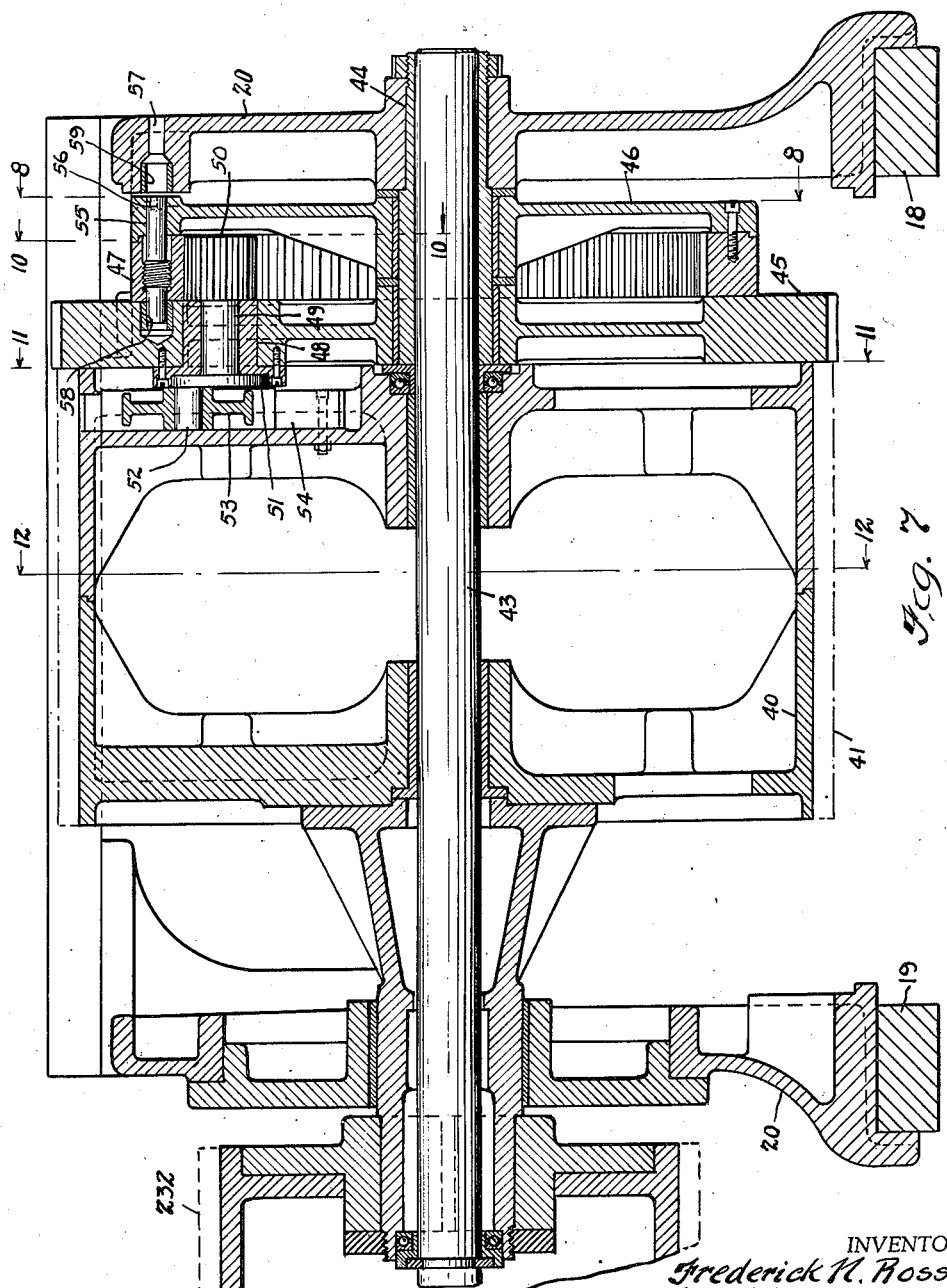

March 14, 1939.　　F. N. ROSS ET AL　　2,150,402
APPARATUS FOR MAKING ROLL-FORGED ARTICLES
Filed July 1, 1935　　26 Sheets-Sheet 8
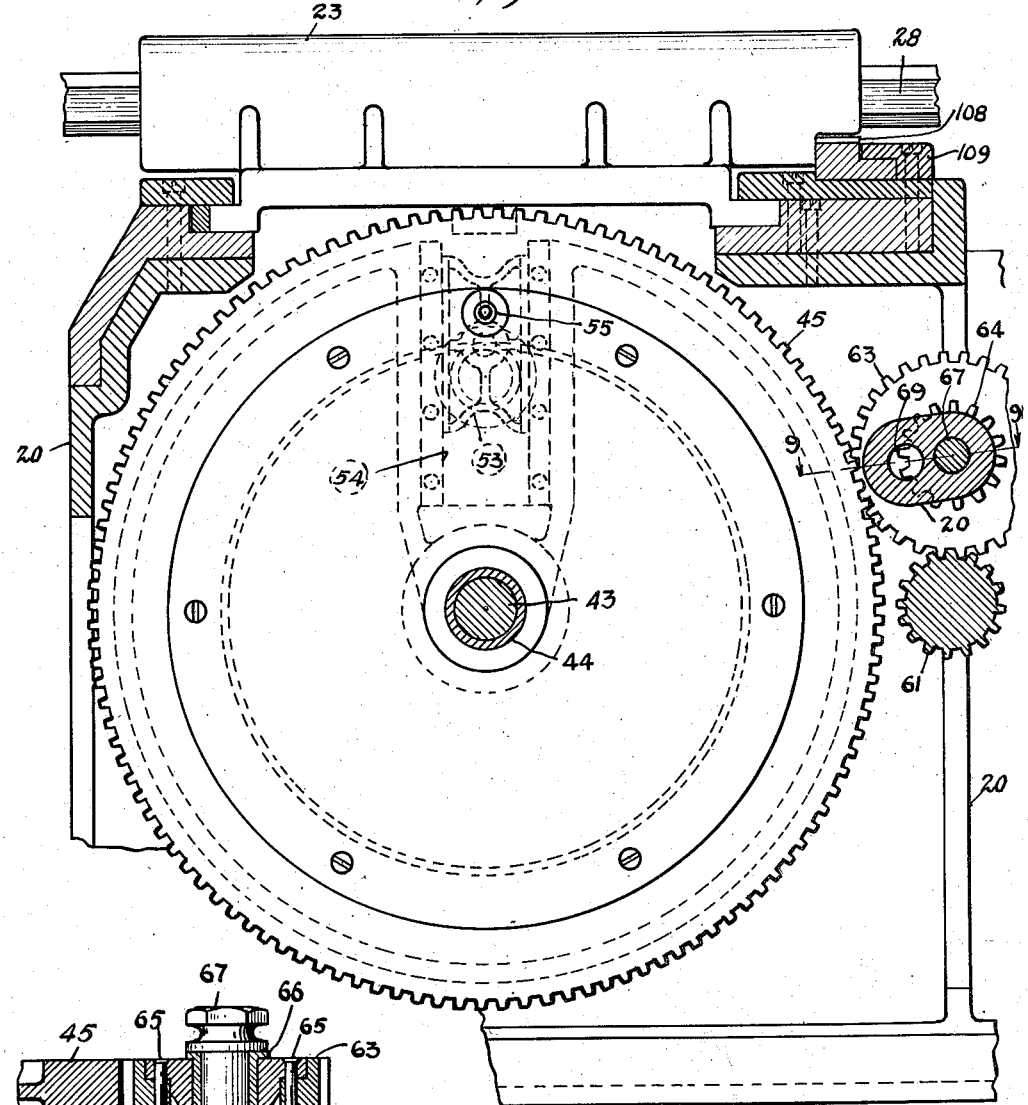
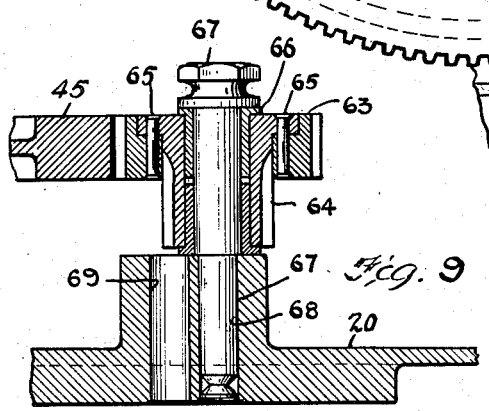
INVENTORS
Frederick N. Ross,
Floyd L. Scoutten and
John F. Ferm.
BY Fay, Oberlin & Fay ATTORNEYS

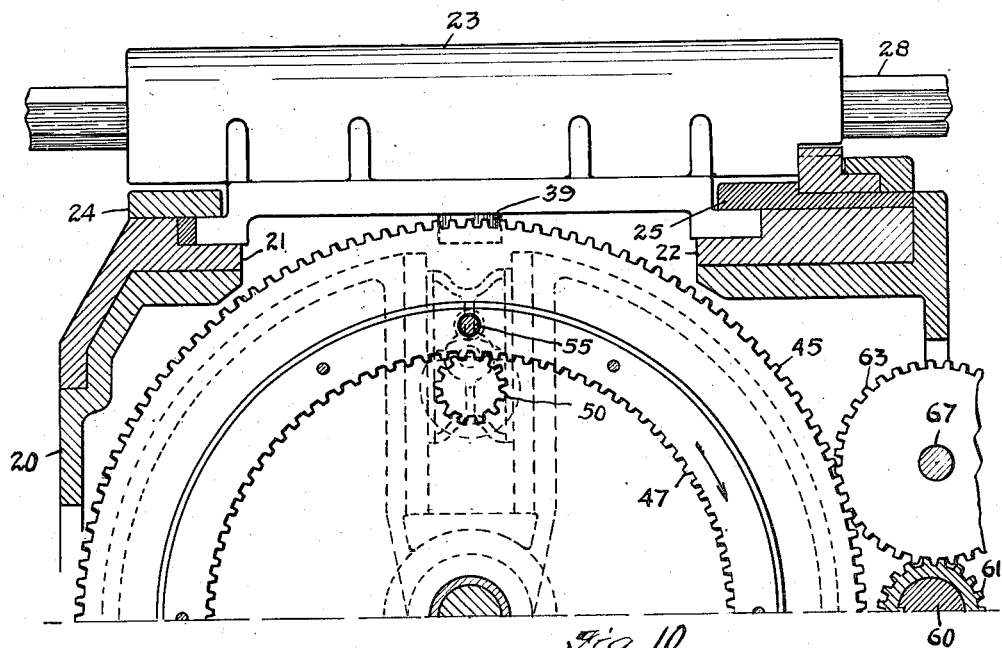
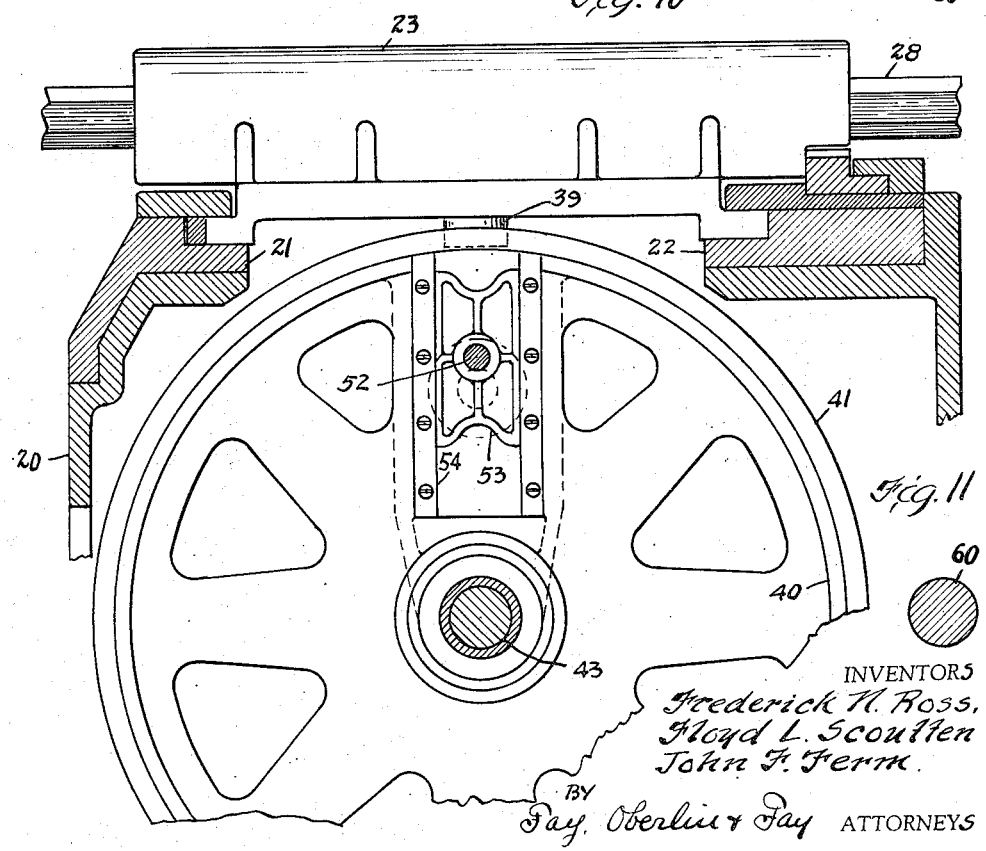

March 14, 1939.  F. N. ROSS ET AL  2,150,402
APPARATUS FOR MAKING ROLL-FORGED ARTICLES
Filed July 1, 1935  26 Sheets-Sheet 10

INVENTORS
Frederick N. Ross,
Floyd L. Scoutten and
John F. Ferm.
BY Fay, Oberlin & Fay ATTORNEYS.

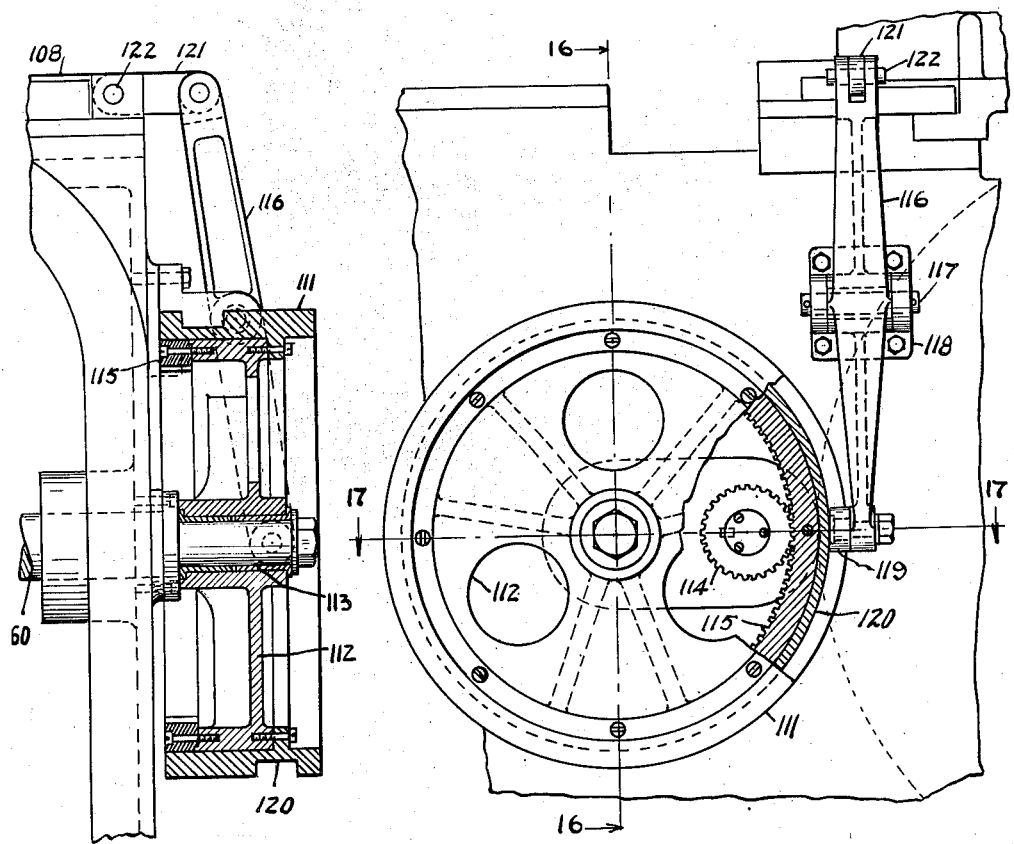
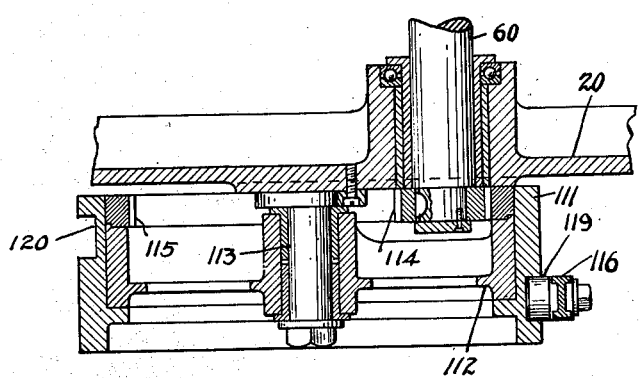

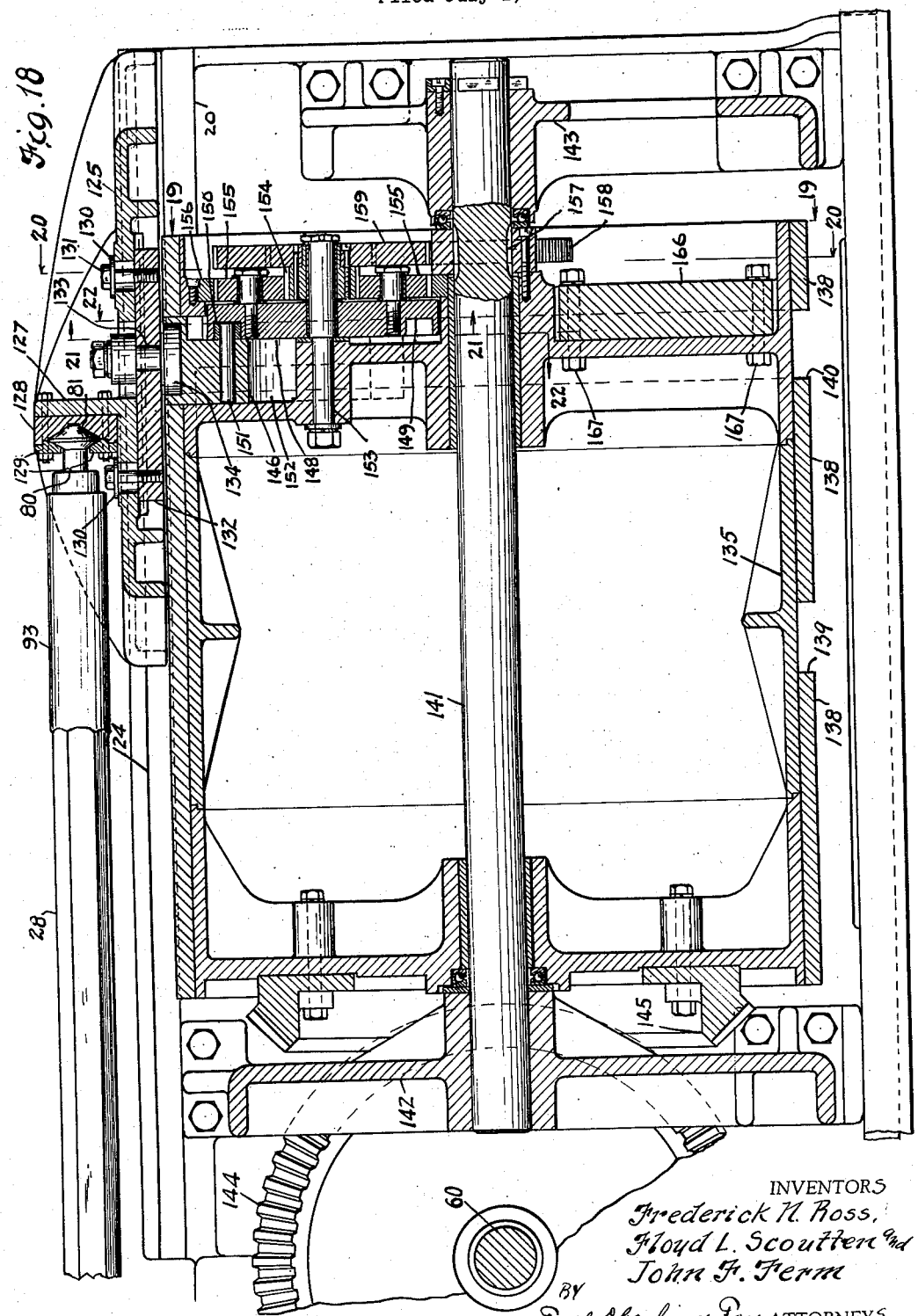

INVENTORS
Frederick N. Ross.
Floyd L. Scoutten and
John F. Ferm.
BY
Fay, Oberlin & Fay ATTORNEYS

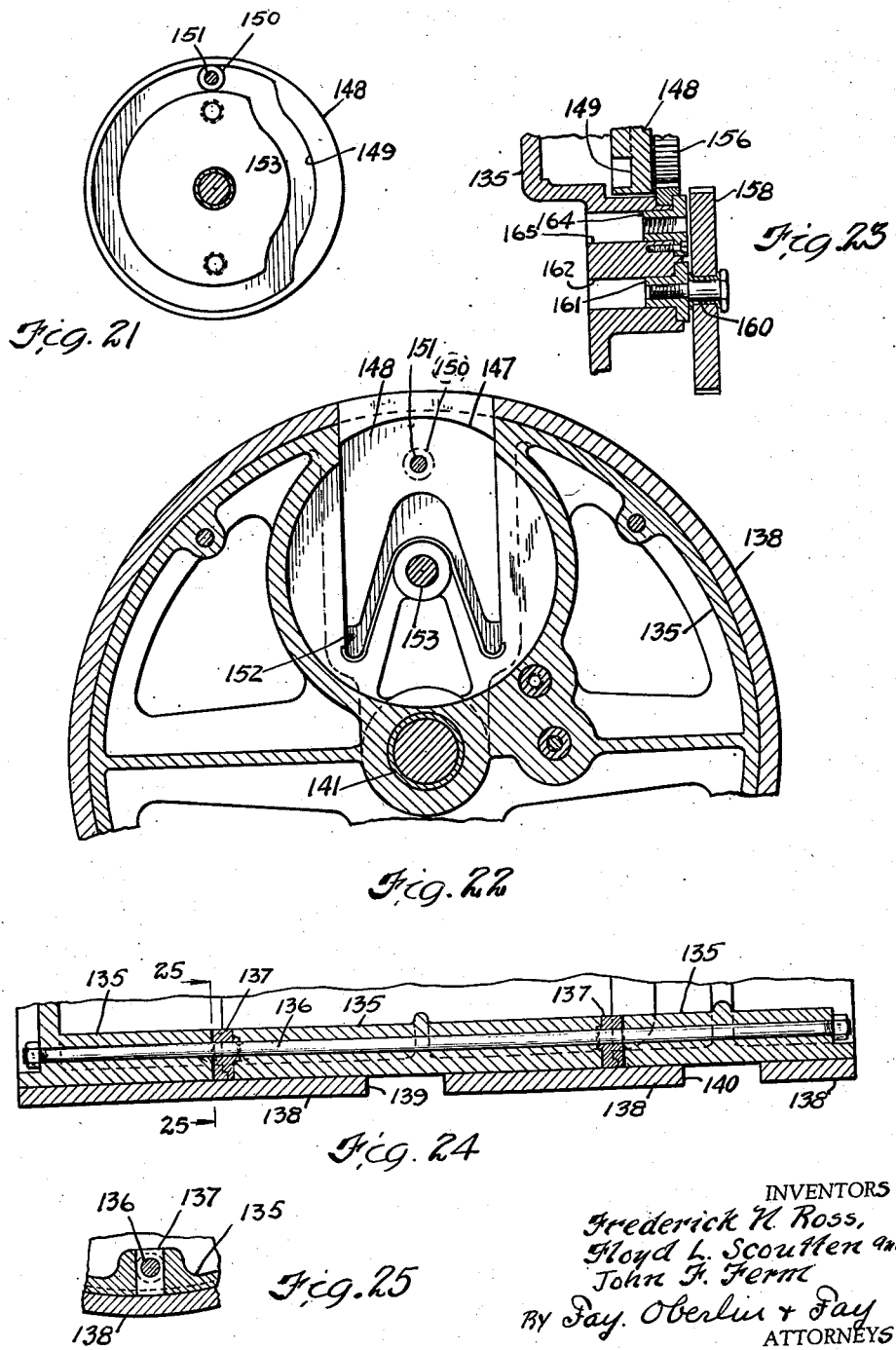

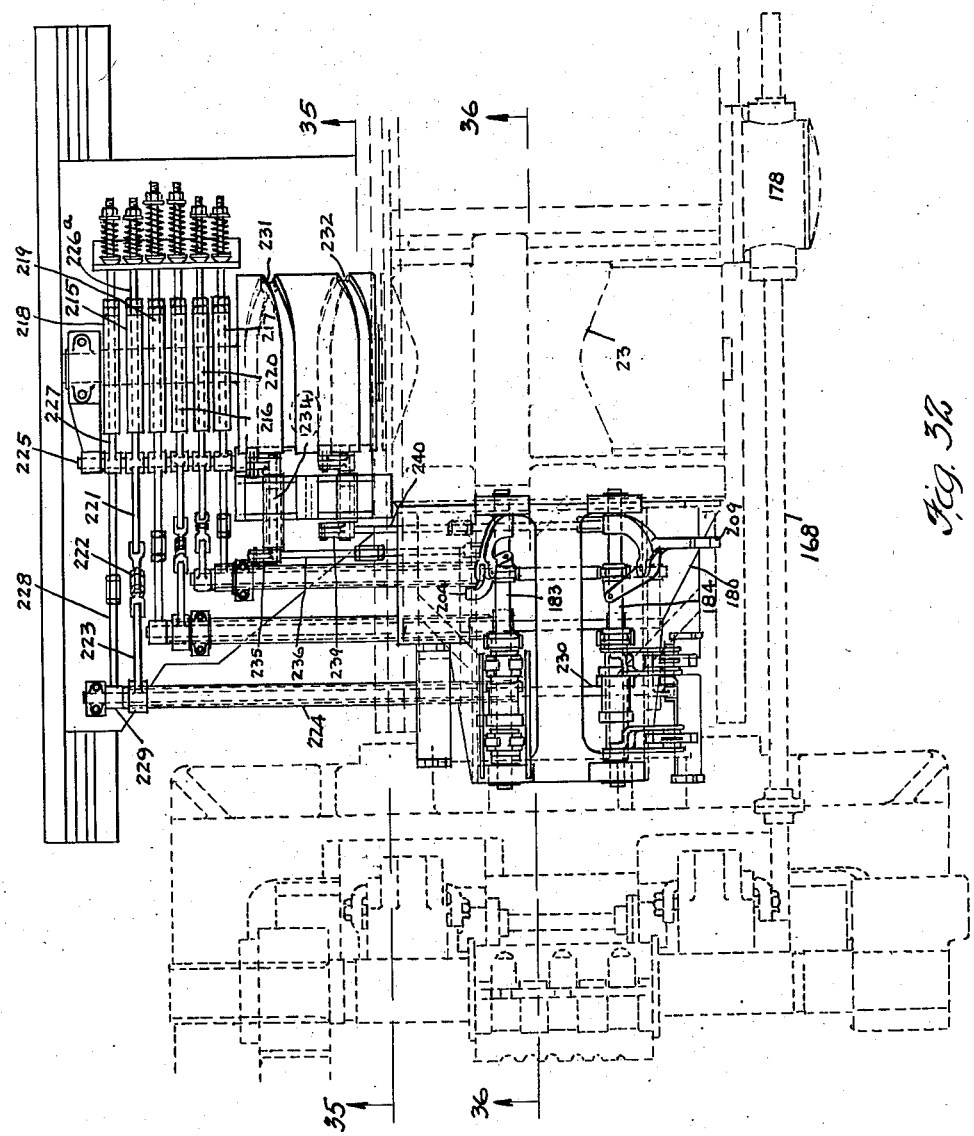

March 14, 1939.  F. N. ROSS ET AL  2,150,402
APPARATUS FOR MAKING ROLL-FORGED ARTICLES
Filed July 1, 1935   26 Sheets-Sheet 17

INVENTORS
Frederick N. Ross,
Floyd L. Scoutten and
John F. Ferm.
BY Fay, Oberlin & Fay
ATTORNEYS

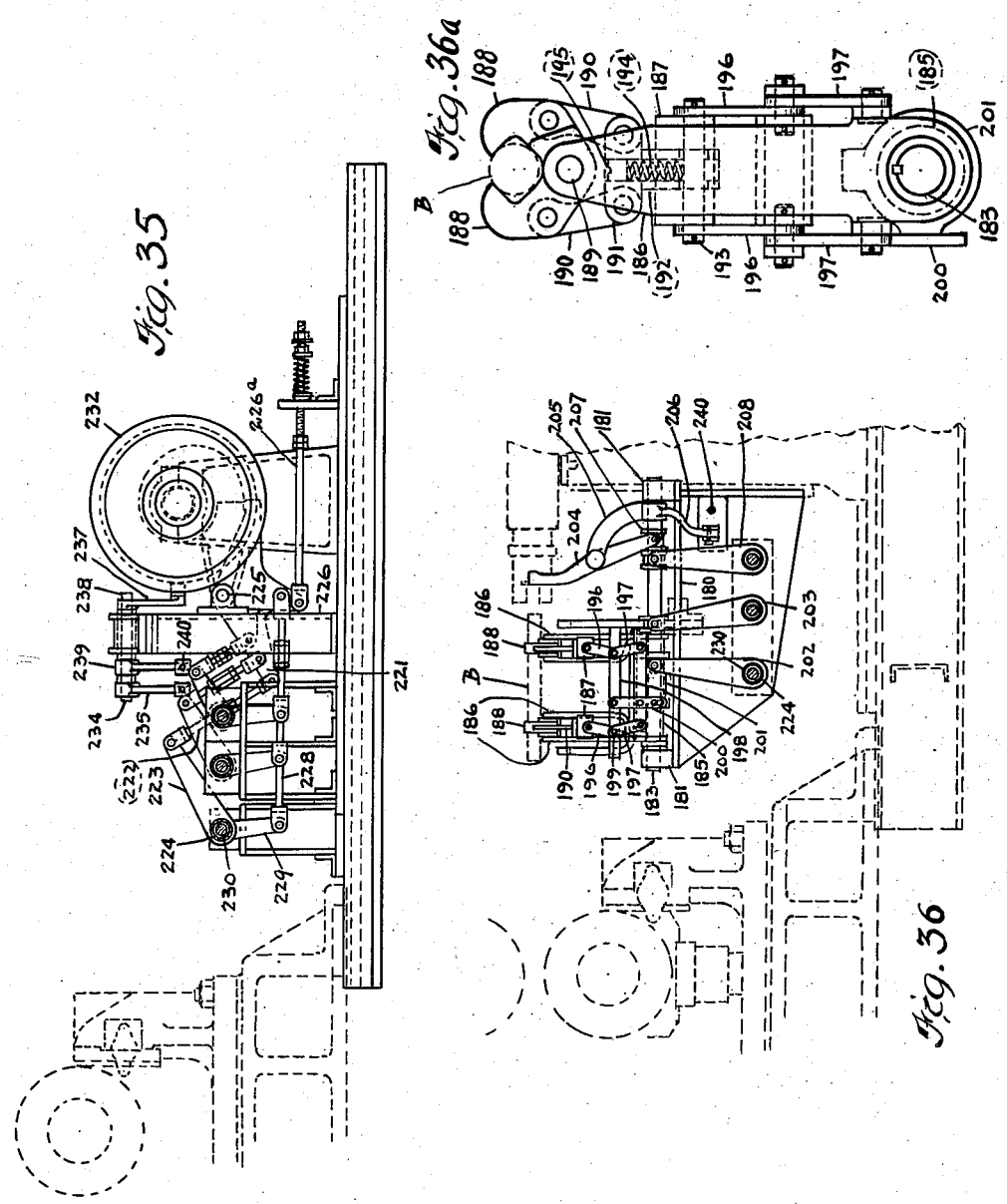

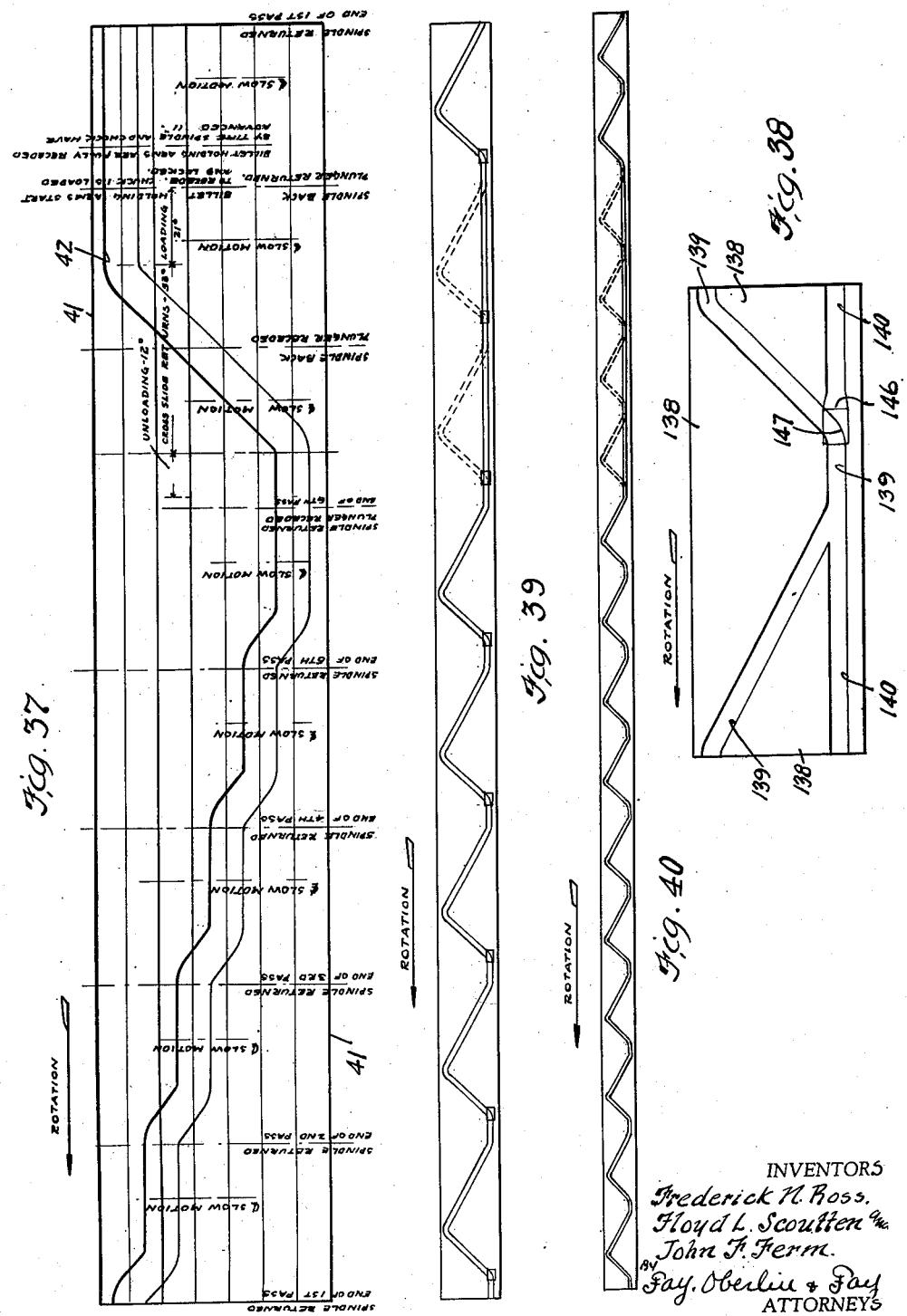

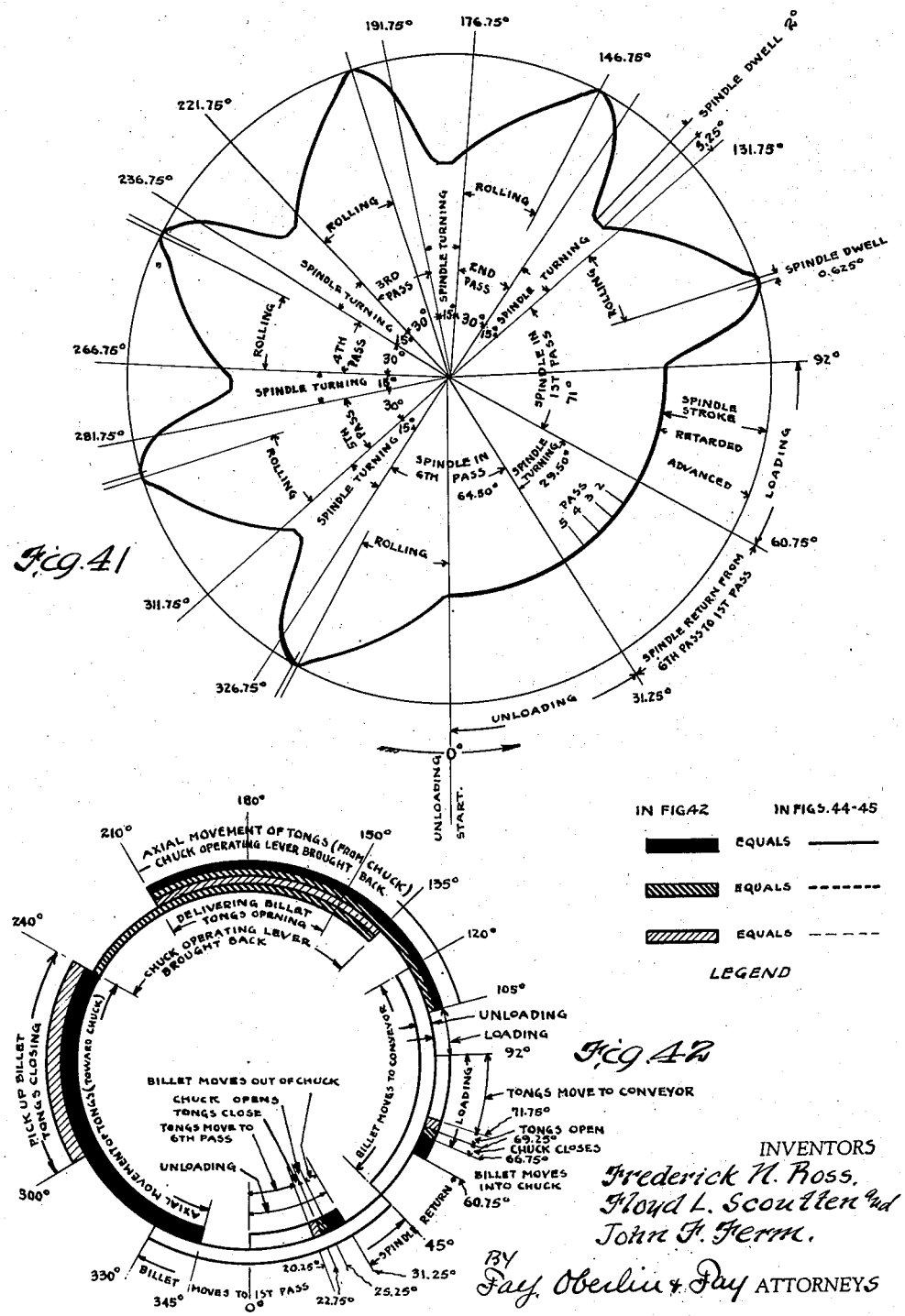

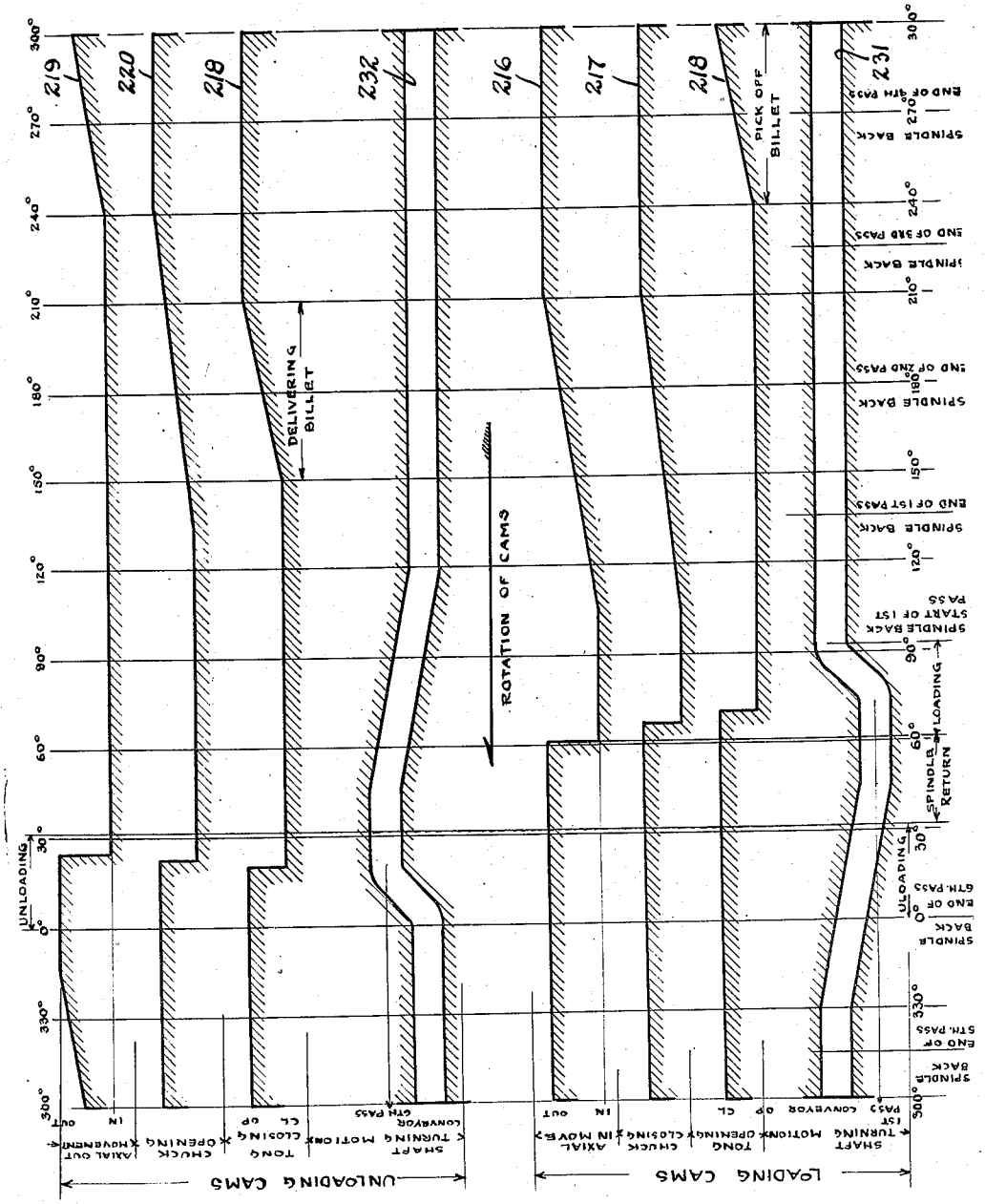

March 14, 1939.  F. N. ROSS ET AL  2,150,402
APPARATUS FOR MAKING ROLL-FORGED ARTICLES
Filed July 1, 1935  26 Sheets-Sheet 22

INVENTORS
Frederick N. Ross,
Floyd L. Scoutten and
John F. Ferm.
BY Fay, Oberlin & Fay, ATTORNEYS

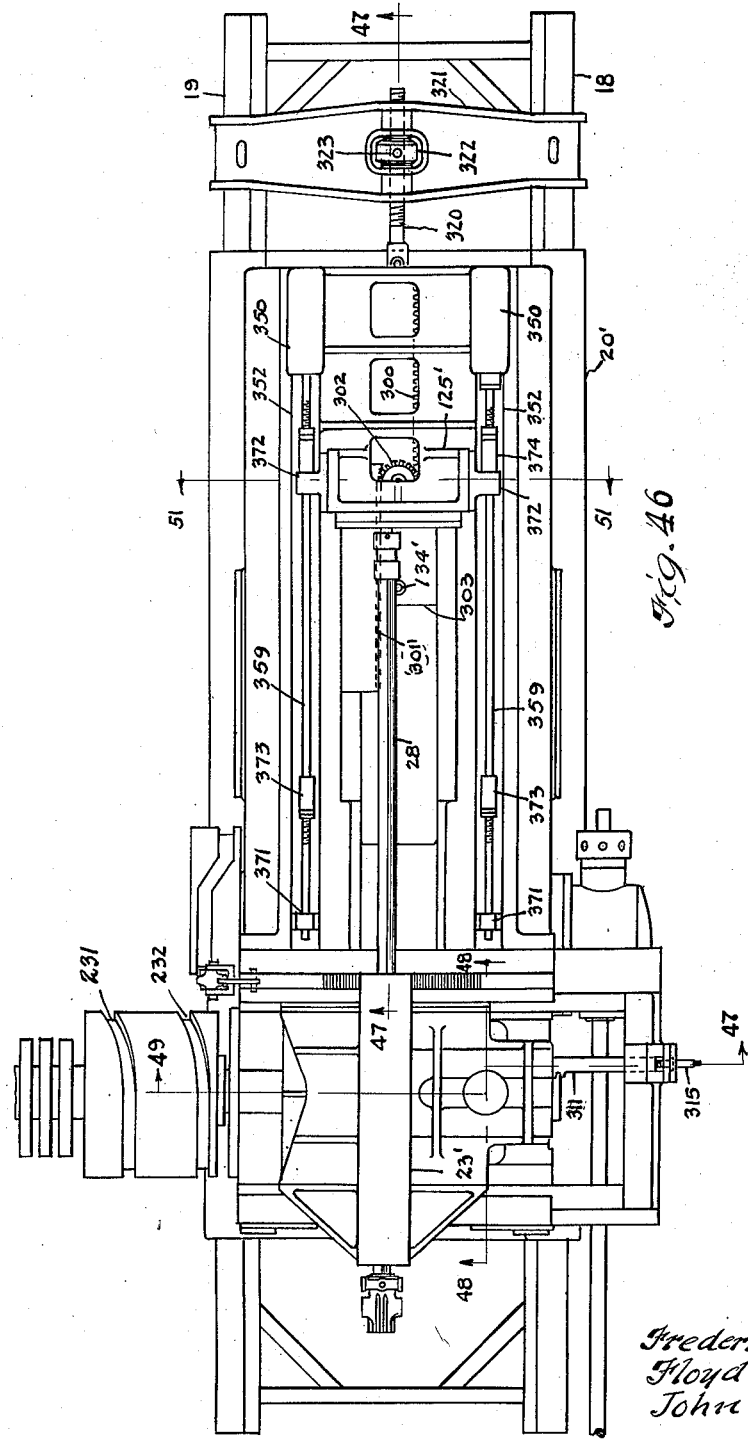

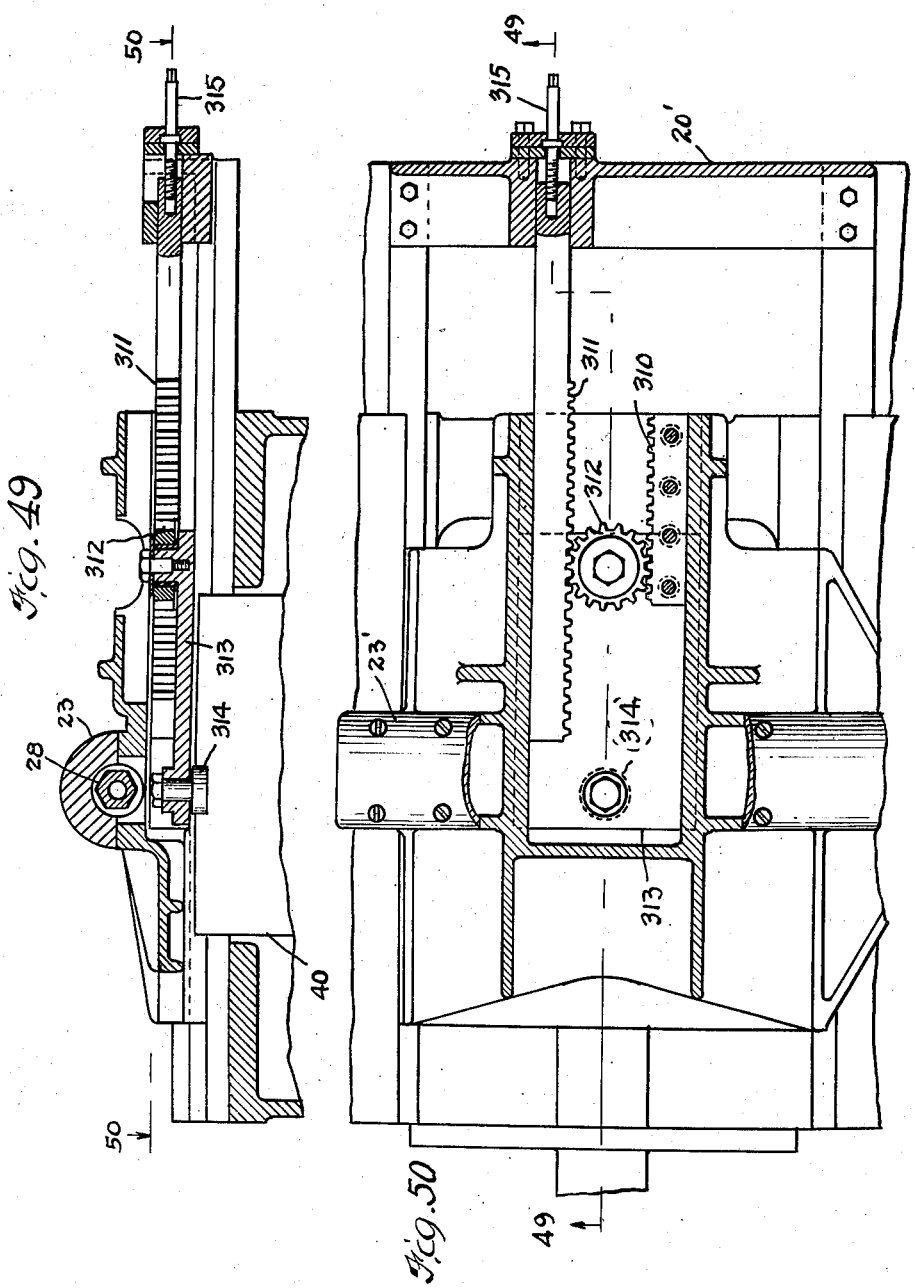

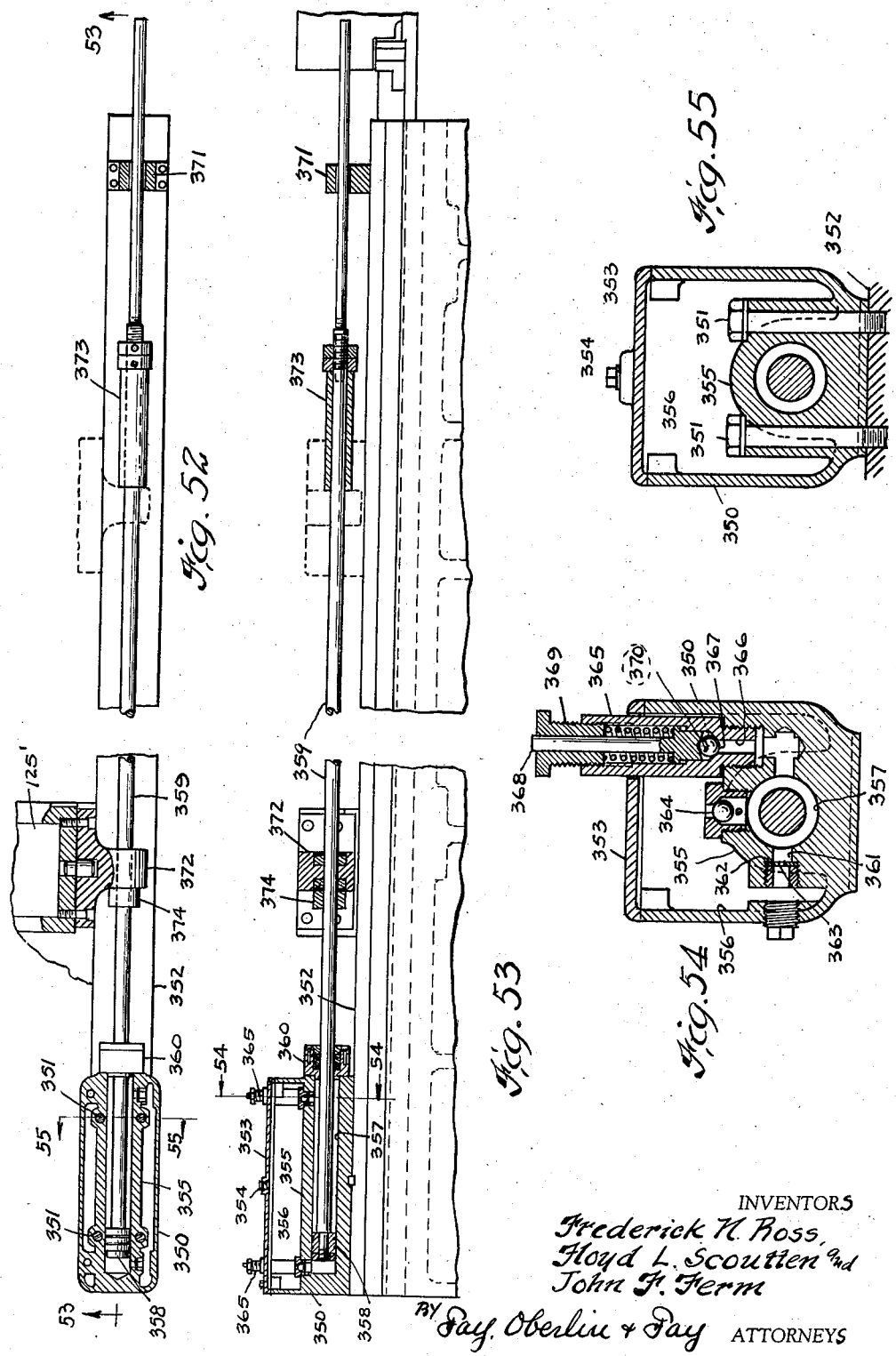

Patented Mar. 14, 1939

2,150,402

UNITED STATES PATENT OFFICE 2,150,402

APPARATUS FOR MAKING ROLL-FORGED ARTICLES

Frederick N. Ross, Detroit, Mich., Floyd L. Scoutten, Hudson, Ohio, and John F. Ferm, Midland, Pa., assignors to Mid-West Forge Company, Cleveland, Ohio, a corporation of Ohio Application July 1, 1935, Serial No. 29,199½

23 Claims. (Cl. 80—26)

This invention relates, as indicated, to apparatus for making roll-forged articles, but has reference more particularly to apparatus for automatically handling bar blanks during forging thereof in roll-forging mills and the like.

Primary objects of the invention are the elimination of the human or personal element in the manufacture of roll-forged articles, the production of such articles in a more uniform manner than is possible with manual control of the various operations, a considerable increase in the capacity of a mill of given size, and the avoidance of the necessity of reheating the bar blank or partly finished product at any stage in the various operations.

Another object of the invention is to provide apparatus of the character described which is adapted to receive a bar blank that has been previously heated to a forging temperature; index the blank so as to bring it into axial alignment with the successive passes of the roll-forging mill, feed the blank one or more times to the successive passes of the mill as it is thus indexed, and rotate the blank about its axis in the intervals between the successive feeding movements.

Another object of the invention is to provide apparatus operating in synchronism with the blank feeding apparatus and adapted to deliver to the latter the heated bar blanks.

A further object of the invention is to provide apparatus operating in synchronism with the feeding and delivery apparatus and adapted to remove or unload the finished or roll-forged articles from the feeding apparatus.

A still further object of the invention is to provide mechanism whereby the roll-forging mill and all of the aforesaid apparatus which is associated therewith are driven in synchronism with each other.

To the accomplishment of the foregoing and related ends, said invention, then, consists of the means hereinafter fully described and particularly pointed out in the claims; the annexed drawings and the following description setting forth in detail certain means for carrying out the invention, such apparatus disclosing, however, but one of the various ways in which the principle of the invention may be used.

In said annexed drawings:

Fig. 1 is a side elevation of the apparatus;

Fig. 2 is a plan view of the apparatus;

Fig. 3 is an enlarged plan view of the cross-slide unit;

Fig. 4 is an elevation of the rear end of the apparatus;

Fig. 5 is a longitudinal cross-sectional view of the apparatus, showing the main driving mechanism;

Fig. 6 is an enlarged cross-sectional view of a portion of the driving mechanism shown in Fig. 4;

Fig. 7 is a transverse cross-sectional view of the cross-slide unit, taken on the line 7—7 of Figs. 3 and 5;

Fig. 8 is a transverse cross-sectional view of the cross-slide unit taken on the line 8—8 of Figs. 5 and 7;

Fig. 9 is a fragmentary cross-sectional view taken on the line 9—9 of Fig. 8;

Fig. 10 is a transverse cross-sectional view of the cross-slide unit, taken on the line 10—10 of Fig. 7;

Fig. 11 is a transverse cross-sectional view of the cross-slide unit, taken on the line 11—11 of Fig. 7;

Fig. 15 is a fragmentary elevation of the rack-moving mechanism, looking in the direction indicated by the arrows 15—15 in Fig. 3;

Fig. 16 is a cross-sectional view, taken on the line 16—16 of Fig. 15;

Fig. 17 is a detail cross-sectional view, taken on the line 17—17 of Fig. 15;

Fig. 18 is a longitudinal cross-sectional view of the rear portion of the apparatus, taken on the line 18—18 of Fig. 4, and showing the spindle reciprocating mechanism;

Fig. 21 is a transverse cross-sectional view, taken on the line 21—21 of Fig. 18 and showing the face of the deflector operating cam;

Fig. 22 is a fragmentary cross-sectional view, taken on the line 22—22 of Fig. 18, and showing the deflector;

Fig. 23 is a fragmentary cross-sectional view, taken on the line 23—23 of Fig. 19 and showing the intermediate gear of the cam deflector operating mechanism;

Fig. 24 is a longitudinal cross-sectional view, taken on the line 24—24 of Fig. 19, and showing the manner in which the sections of the spindle cam drum are assembled;

Fig. 25 is a fragmentary cross-sectional view, taken on the line 25—25 of Fig. 24;

Fig. 26 is a view, partly in section and partly in elevation, of the forward end of the work-carrying spindle;

Fig. 27 is a front elevation of the work-holding chuck;

Fig. 28 is a cross-sectional view of the work-chuck, taken on the line 28—28 of Fig. 3;

Fig. 29 is a cross-sectional view, taken on the line 29—29 of Fig. 3;

Fig. 30 is a longitudinal cross-sectional view showing the spindle compensating mechanism;

Fig. 31 is a transverse cross-sectional view, taken on the line 31—31 of Fig. 30;

Fig. 32 is a plan view of the loading and unloading mechanism;

Fig. 35 is a view, partly in section and partly in elevation, taken on the line 35—35 of Fig. 32;

Fig. 36 is a view partly in section and partly in elevation, taken on the line 36—36 of Fig. 32;

Fig. 36a is an enlarged detail view of the loading tongs;

Fig. 37 is a development of the cam which causes transverse sliding movement of the spindle carriage;

Fig. 38 is a development of the spindle reciprocating cam;

Fig. 39 is a diagram showing the complete cycle of rotations of the spindle reciprocating cam during a single pass treatment of a bar blank;

Fig. 40 is a diagram similar to Fig. 39, but showing the complete cycle of rotations of the spindle reciprocating cam during a double-pass treatment of a bar blank;

Fig. 41 is a diagram showing the movement of the spindle during one complete cycle of operations;

Fig. 42 is a diagram showing the relation of the various movements of the loading and unloading devices in a single cycle of operations;

Fig. 43 is a development of the loading and unloading cams;

Fig. 46 is a plan view of a modified form of the apparatus;

Fig. 49 is a fragmentary transverse cross-sectional view of the cross-slide unit, taken on the lines 49—49 of Figs. 46 and 50;

Fig. 50 is a fragmentary horizontal cross-sectional view of the cross-slide unit, taken on the line 50—50 of Fig. 49;

Fig. 52 is a view, partly in plan and partly in section of a portion of the shock absorber;

Fig. 53 is a cross-sectional view of the shock absorber, taken on the line 53—53 of Fig. 52;

Fig. 54 is a transverse cross-sectional view, taken on the line 54—54 of Fig. 53; and Fig. 55 is a transverse cross-sectional view, taken on the line 55—55 of Fig. 52.

Figure 47:
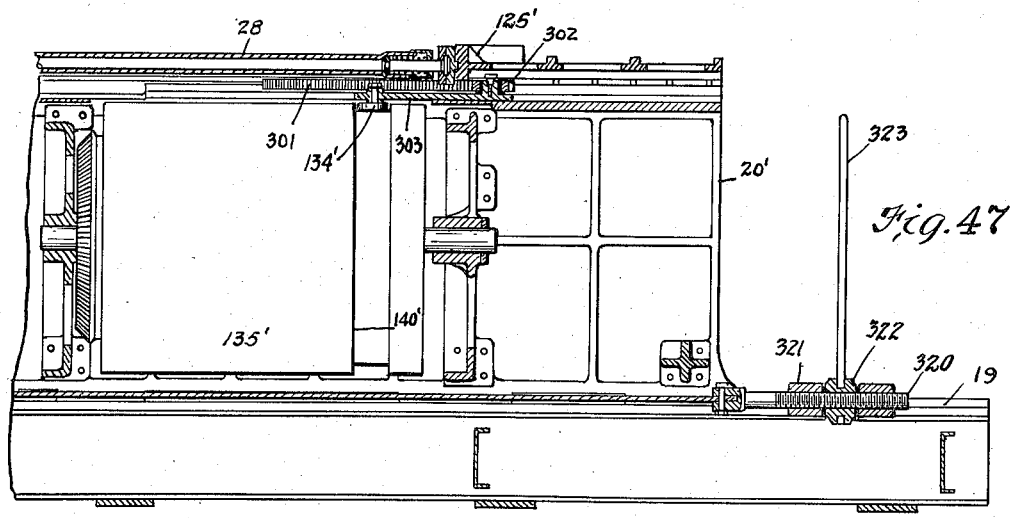
Fig. 47 is a fragmentary longitudinal cross-sectional view, taken on the line 47—47 of Fig. 46.

Although the present apparatus is capable, with suitable modifications, of being employed in connection with forging machines of various types, it has been designed, in this particular case, for use in association with a roll forging mill used for making roll-forged articles, such for example as automobile axles.

A roll-forging mill of the type fragmentarily disclosed in this application is shown and described in substantial detail in the patent to F. H. Moyer, No. 1,736,321, granted Nov. 19, 1929, and the patent to Floyd L. Scoutten, No. 2,081,959, granted June 1, 1937, and the description in the present case will accordingly be limited to the essential features of the mill.

As shown more particularly in Figs. 1 and 2, the roll-forging mill comprises spaced housings, in which are journalled the upper and lower rolls 12 and 13 respectively. Rolls 12 and 13 are respectively provided with removable forging dies 14 and 15, which extend substantially 180 degrees of the circumference of the rolls to which they are secured and are arranged to cooperate to produce a forged article. Each of the dies is provided with a series of circumferential grooves (not shown) and the grooves in one die cooperate with the corresponding grooves in the other die to provide a plurality of passes through which a bar blank is adapted to be successively passed to produce the desired finished article. The successive passes are numerically designated in Fig. 2. In the use of roll-forging mills of the aforesaid character, it has heretofore been the practice for an operator to grip a heated bar blank with a pair of tongs and pass the blank between the rolls when the dies of the latter are out of pass-defining relationship, the position of the blanks or partly finished product being determined by suitable stops at the rear of the mill. With the bar blank thus positioned, and the rolls revolving in the direction indicated by the arrows in Fig. 1, the dies grip the bar and roll it outwardly towards the operator, the produce being rolled to the shape of the grooves in the dies. The die is given one or more passes through each set of grooves in the dies, and is also rotated upon its axis between each rolling operation so as to preclude the formation of a fin on the product at any stage of the forging thereof.

It will be noted that the foregoing operations involve the gripping of the bar blank or partly finished product by means of tongs in the hands of an operator. Such operator must necessarily be highly skilled in his duties, as he is required not only to firmly grip and manipulate the tongs during the aforesaid rolling and blank rotating movements, but to properly position the blank or partly finished product for each rolling operation. Inasmuch as it is desirable in most cases to produce the finished or substantially finished article without reheating the bar blank or partly finished product at any stage in the operations, the operator is of necessity obliged to so time his movements as to avoid undue delays. In most cases, however, it is difficult for an operator, no matter how skilled he may be, to handle the bar blanks with sufficient rapidity to entirely obviate the necessity of reheating during the operations, and in any event, speed in the direction of rapid handling of the blanks is often at the expense or sacrifice of uniformity in the contour or configuration of the finished product.

As previously stated, the present invention has as its primary objects the elimination of the human or personal element in the manufacture of roll-forged articles, the production of such articles in a more uniform manner than is possible with manual control of the various operations, a considerable increase in the capacity of a mill of given size, and the avoidance of the necessity of reheating the bar blank or partly finished product at any stage in the various operations.

Referring again to the drawings, the rolls in the present mill are driven by a suitable motor (not shown) through the intermediary of gears 16 and 17 which are in mesh with each other and with gears (not shown) mounted on the necks of the rolls 12 and 13 respectively.

Extending longitudinally in advance of the roll-forging mill are a pair of spaced rails 18 and 19, which form the main supports for the apparatus to be hereinafter described.

Referring now to Figs. 1, 2, 3 and 7 to 13 inclusive, the rails 18 and 19 have mounted thereon a housing 20, the upper forward portion of which is provided with spaced rails 21 and 22 for supporting a spindle carriage 23, the carriage being mounted on these rails for sliding movement transversely of the housing. Hold-down plates 24 and 25 are provided for maintaining the carriage 23 against vertical displacement.

The carriage 23 is provided at its ends with rings 26 for retaining bearings 27 and 27a, in which is mounted a spindle 28, which is of hexagonal cross-section. The spindle is provided with a number of annular felts 29 for oiling the spindle to facilitate reciprocation thereof. The carriage may be adjusted longitudinally of the housing 20 to a slight extent, and for this purpose, a gib 30 is provided, the position of which is controlled by adjusting screws 31 and locking screws 32.

Figure 13:
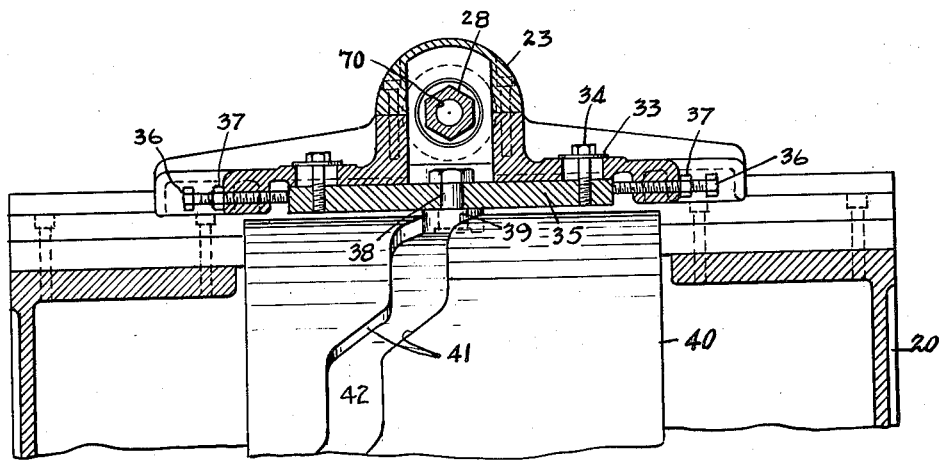
Fig. 13 is a fragmentary transverse cross-sectional view of the cross-slide unit, taken on the line 13—13 of Figs. 3 and 12.
Figure 14:
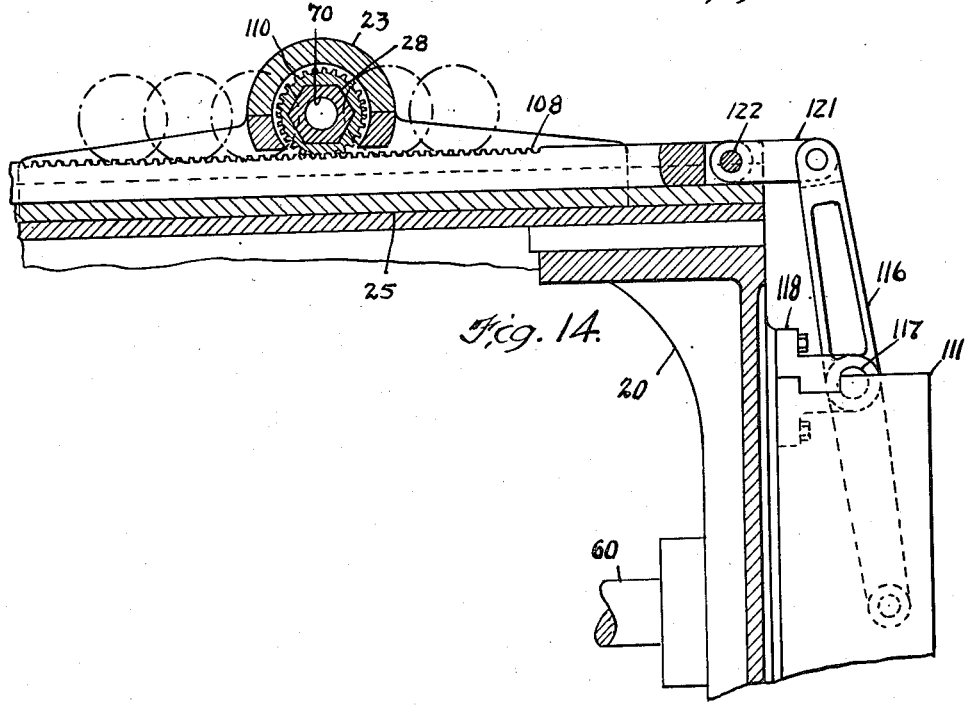
Fig. 14 is a fragmentary transverse cross-sectional view of the cross-slide unit, taken on the line 14—14 of Figs. 3 and 12.

Secured to the lower surface of the carriage, as by means of lock plates 33 and screws 34, is a plate 35, which, as shown in Figs. 3 and 13, may be adjusted transversely of the housing, and locked in adjusted position, as by means of screws 36 and lock-nuts 37. The plate 35 carries centrally thereof a stud 38, on the lower end of which is mounted a cam roller 39.

Figure 5A:
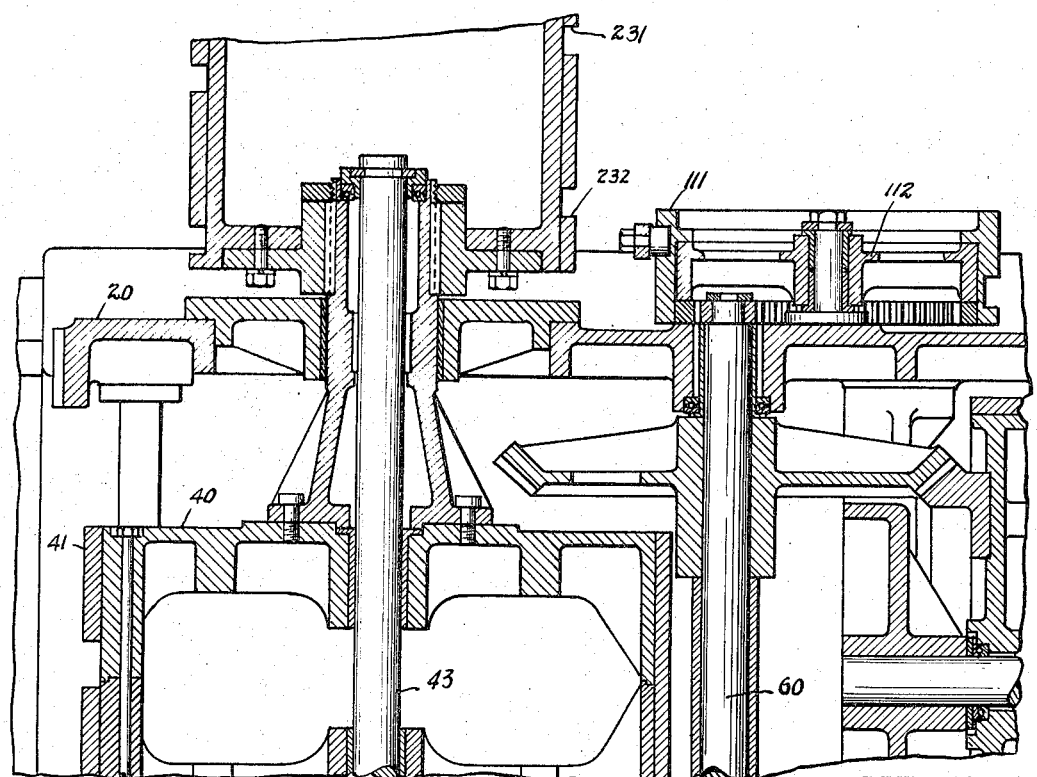
Fig. 5a is an enlarged detail of a portion of Fig. 5.
Figure 12:
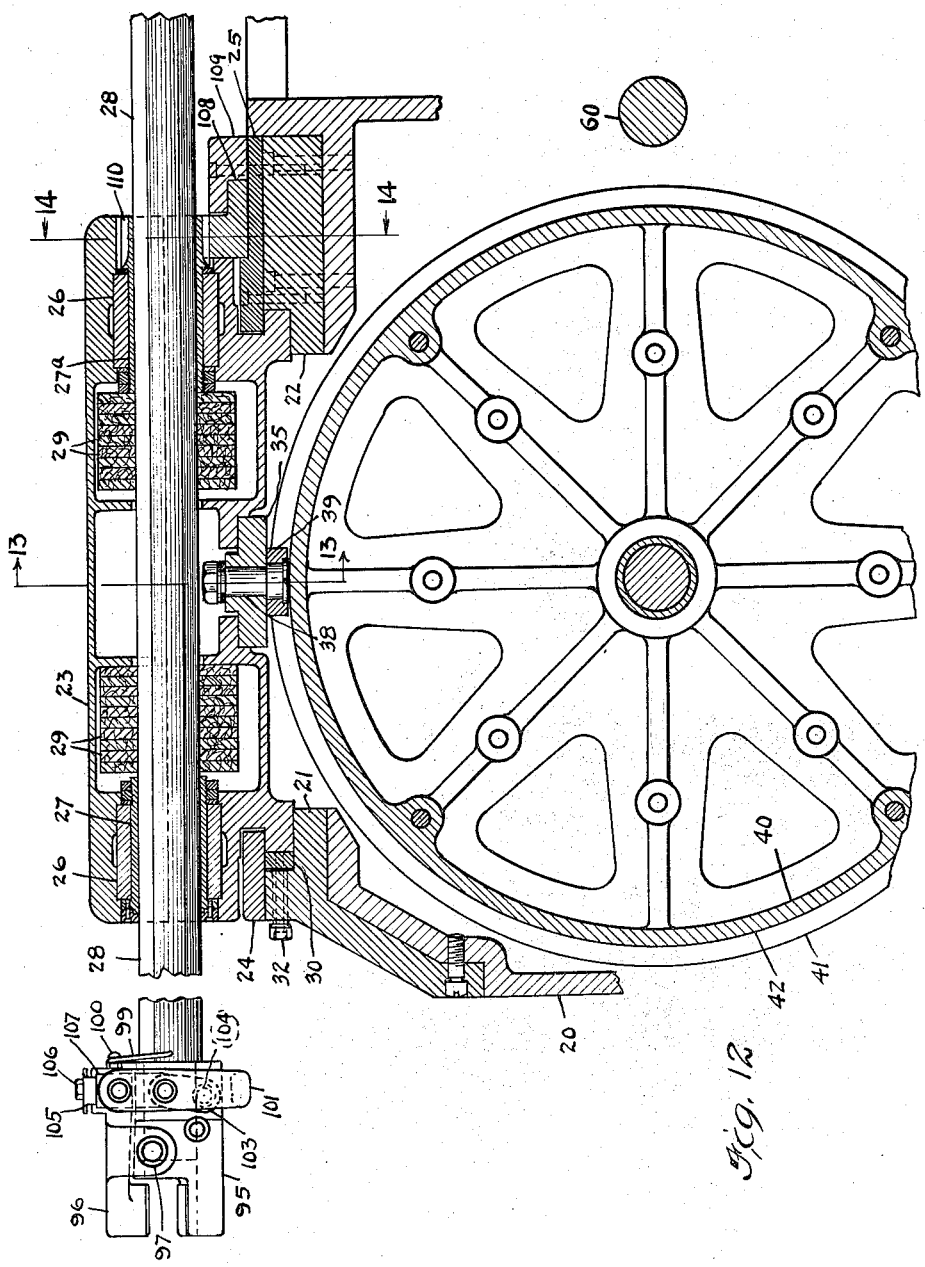
Fig. 12 is a transverse cross-sectional view of the cross-slide unit taken on the line 12—12 of Figs. 3 and 7.

Suitable mechanism is provided for causing the carriage 23 and its associated elements to slide transversely of the housing. Such mechanism includes a cylindrical drum 40, having secured to the outer peripheral surface thereof plates 41, which are so arranged as to provide therebetween a continuous cam groove 42, the development of which appears in Fig. 37. As shown in Fig. 12, the roller 39 is disposed in the cam groove 42, so that rotation of the drum will cause the carriage to slide transversely of the housing in steps governed by the contour of the cam groove. The drum 40, as shown most clearly in Figs. 5, 7 and 12, is mounted for rotation about a shaft 43, which is non-rotatably mounted in the side walls of the housing 20. The shaft 43 is provided adjacent one end with a sleeve 44, upon which are rotatably mounted a bull gear 45 and a spider 46, to which is rigidly secured an internal gear ring 47. The bull gear 45 has rigidly secured thereto at one point in its circumference, a bearing 48, in which is journalled a crank shaft 49. Shaft 49 is provided at one end with a pinion 50 in mesh with gear ring 47 and at the other end with a crank disk 51, upon which is eccentrically mounted a crankpin 52. The crankpin 52 extends through a shoe 53 mounted for reciprocal sliding movement in a radial slot 54 in one end of the cam drum 40.

For a purpose to be later described, the cam drum is at times adapted to be rotated in a continuous manner and at other times in an intermittent manner. To permit a change from one manner of rotation to the other, the gear ring 47 is provided with a screw 55, which is threadedly secured to the gear ring and extends transversely thereof. This screw has a socket 56 in one end adapted to be engaged by a wrench entered through an aperture 57 of the housing 20, whereby the screw may be selectively caused to extend into the bushing 58 in the bull gear 45 or withdrawn from this bushing and caused to extend into a bushing 59 in the housing 20.

When the screw extends into the bushing 58, the gear ring 47 is locked to the bull gear and these gears are therefore rotatable as a unit, a rigid driving connection being then established through the bearing 48, crank shaft 49, crank disk 51, crankpin 52 and shoe 53 to the drum 40. The shoe 53 will remain in a fixed position in the slot 54, so that the drum 40 will be driven in a continuous manner and at a constant speed.

When it is desired to drive the drum 40 in an intermittent manner the screw 55 is withdrawn from bushing 58 and caused to extend into the bushing 59, thereby locking the gear 47 to the housing 20. Rotation of the bull gear will then be imparted to the cam drum as before, but a part of this motion will be lost, due to the fact that the shoe 53, as a result of rotation of the pinion 50 on its own axis, will be reciprocated in the radial slot 54 of the cam drum.

As shown most clearly in Figs. 5, 6, 8, 9 and 10, the bull gear 45 is driven by the cross-drive shaft 60 through the medium of gearing which includes a pinion 61 formed as an integral part of the miter gear 62 which is keyed to the shaft 60, and an intermediate large gear 63, which is in mesh with the bull gear. When the intermediate gear 63 is in mesh with the bull gear, a drive ratio of eight to one is secured, but at times, it is desirable that a drive ratio of sixteen to one be had, and for this purpose, a small intermediate gear 64 is provided. As shown in Fig. 9, the gear 64 is concentric with the gear 63 and is rigidly secured thereto as by means of pins or rivets 65. The gear 64 is mounted for rotation on a bushing 66, which in turn is mounted on a stud 67. Stud 67 is mounted in an aperture 68 of the housing 20. When it is desired to secure the sixteen to one drive, the stud 67 is removed, the gears 63 and 64 reversed, and the stud mounted in an aperture 69 which is adjacent the aperture 68, but so spaced therefrom that the gears 63 and 64, when reversed as aforesaid, are respectively brought in mesh with the pinion 61 and bull gear 45.

The construction of the spindle 28 and chuck which is carried thereby, are shown most clearly in Figs. 3, 12, 13, 14, 18 and 26 to 31 inclusive. The spindle 28 is preferably made of a heat-resisting alloy, is of a hexagonal cross-section and has an internal bore 70 of circular cross-section. Threadedly secured within one end of the spindle is a sleeve 71, within which is mounted a stop member 72. The forward end of the spindle is also provided with a series of spaced longitudinally extending grooves 78, the function of which will be later explained.

The rear end of spindle 28 is of reduced external diameter, and is counterbored as at 79 to receive a plunger 80 provided with an enlarged head 81. This plunger is designed to have a limited degree of movement axially of the spindle, but is prevented from rotating with respect to the spindle, as by means of a key 82, which extends through keyways or slots 83 in the wall of the spindle. A sleeve 84 encircles the key 82 and the space between this sleeve and the plunger 80 is taken up by semi-cylindrical bushings 85 and 86. The spindle has also mounted thereon collars 87 and 88, which respectively abut the front and rear edges of the key 82. The spindle is externally threaded at longitudinally spaced points to receive adjusting nuts 89 and 90. Disposed between the collar 87 and adjusting nut 89 is a compensating coil spring 91, and disposed between the collar 88 and nut 90 is a similar spring 92. It will be understood that the nuts 89 and 90 may be adjusted to vary the degree of compression of the springs with which they are respectively in engagement. The compensating mechanism at the rear of the spindle is normally covered as by means of a sleeve 93 removably secured to the spindle as by a set screw 94.

The spindle 28 has removably secured to its forward end a chuck, the detailed construction of which is shown most clearly in Figs. 3, 12 and 26 to 29 inclusive. This chuck, as will appear hereinafter, is for the purpose of gripping and holding the heated bar blanks during the various rolling operations. The chuck comprises a body 95 which has a drive fit on the spindle and a clamping arm 96, which is pivotally connected to the chuck body as by means of bushings 97 secured to the chuck body by suitable bolts (not shown). The forward ends of the chuck body and arm 96 are formed as jaws, to which are removably secured inserts 98 made of heat and wear-resistant metal. The arm 96 is maintained in open position by means of a spring 99 which is pivotally secured to the spindle, as shown in Figs. 12 and 29 and engages a post 100 secured to and extending from the rear end of the arm. Toggle mechanism is provided for closing the jaws, and includes an operating lever 101 which is pivotally secured to a pin 102 extending transversely of the arm 96 and a pair of toggle links 103, which are pivotally secured to a pin 104 extending transversely of the chuck body and to the arm of the lever 101. When the lever 101 is in the vertical position shown in Fig. 12, the arm 96 is in locked or closed postion, the elements of the toggle mechanism being maintained in this position by means of a spring 105 secured to the arm by means of a cap screw 106 and having its ends bearing on seats 107 mounted on the pin 102. The arm may be moved to open position by a slight rotation of the lever 101 in a clockwise direction, as viewed in Fig. 12.

Mechanism is also provided for rotating the spindle 28 upon the axis coincidently with the indexing or movement of the spindle into alignment with the successive passes formed by the rolls. Such mechanism is best illustrated in Figs. 3, 8, 12 and 14 to 17 inclusive.

Referring to these figures, it will be seen that the hold-down plate 25 has mounted thereon a rack 108, which is disposed adjacent the rear end of the carriage 23 and is maintained against vertical displacement as by means of a hold-down plate 109. The rack 108 extends substantially the entire width of the housing 20 and is in engagement with a pinion 110, formed as an integral portion of the sleeve 27a, so that when the rack is stationary, the indexing of the spindle is accompanied by a 90° rotation thereof upon its axis. The rack is maintained stationary at such times as it is desired that the bar blank be given only a single pass through each roll pass.

When, as will be later described, it is desired to give the bar blank two passes in each roll pass, it becomes necessary to rotate the spindle during the interval between the passes of each pair of passes in each roll pass, and for this purpose it is necessary to slide the rack a distance sufficient to rotate the spindle 90°, the carriage 23 remaining stationary during such movement of the track. Mechanism for thus sliding or reciprocating the rack includes a cam drum 111, which is secured to a spider 112 journalled on a stub shaft 113 extending from the side wall of housing 20. The cam drum 111 is adapted to be continuously rotated by the cross-drive shaft 60 as by means of a gear 114 mounted on the end of the shaft and in mesh with an internal gear 115 secured to the spider 112 of the cam drum. Rotation of the cam drum is translated into reciprocal movement of the rack 108 by means of a lever 116 which is pivoted intermediate its ends on a pin 117 mounted on a bracket 118 secured to the side of the housing 20. The lever 116 has secured to its lower end a roller 119, which is disposed in the cam groove 120 of the cam drum, and is secured at its upper end to a link 121, which in turn is secured to the rack 108, as by means of a pin 122. When reciprocation of the rack is not desired, the link 121 is removed and the rack locked to the housing in any desirable manner.

Mechanism is also provided for reciprocating the spindle as it becomes aligned with each pass of the rolls, such mechanism being shown most clearly in Figs. 1, 2, 4, 5 and 18 to 25 inclusive of the drawings.

Referring to these figures, the rear portion of the housing 20 is shown as provided with transversely spaced rails 123 and 124 for slidably supporting the longitudinally reciprocable carriage 125. A pair of hold-down plates 126 is provided for maintaining the carriage 125 against vertical displacement. The carriage 125 is provided with an upstanding transversely extending rib 127, to the front face of which are rigidly secured a base plate 128 and cap plates 129 forming a transversely extending slot or passageway for the head 81 of the spindle plunger.

Secured to the lower surface of the carriage 125, as by means of lock plates 130 and screws 131, is a plate 132, which, as shown in Figs. 2 and 18, may be adjusted longitudinally of the housing. The plate 132 carries substantially centrally thereof a stud 13, on the lower end of which is mounted a ball-bearing cam roller 134.

Suitable mechanism is provided for reciprocating the carriage 125. Such mechanism includes a cylindrical cam drum 135, which is made in three sections, secured to each other as by means of tie bolts 136, apertured lock keys 137 being provided between the sections along one of the tie rods (see Figs. 24 and 25) to assist in aligning the sections and prevent circumferential displacement of the sections relative to each other. The drum has secured to the outer peripheral face thereof plates 138, which are so arranged as to provide therebetween a continuous cam groove 139, and a circular cam groove 140 which intersects the cam groove 139 at two points. The development of these cam grooves is clearly shown in Fig. 38. The drum 135, as shown most clearly in Fig. 18, is mounted for rotation about a shaft 141, which is non-rotatably mounted in the cross-members 142 and 143 of the housing 20.

The cam drum 135 is driven by the cross-drive shaft 60 through the medium of miter gear 144, which is keyed to the drive shaft, and miter ring gear 145, which is bolted to one end of the cam drum.

Reciprocation of the spindle 28 is effected by rotation of the cam drum, the cam roller 134 in effect traversing the cam groove 139 during such movement of the spindle.

At the conclusion of the rolling operations, however, it is desirable to retain the spindle in its retracted position for a period of time sufficient to return the spindle to its initial or loading position and load the heated bar blank on the chuck thereof.

For this purpose there is provided a cam roller deflector or switch 146, having an arcuate channel or groove 147 in its upper surface, which, when the switch 146 is in its normal or uppermost position, forms a part of the cam groove 139. In order to retain the spindle in its retracted position, the switch 146 is adapted to be periodically lowered and maintained in its lowered position, during which time the roller 134 will traverse the circular groove 140 instead of the cam groove 139.

The switch 146 is periodically lowered by means of a cam 148 having a cam groove 149, in which is disposed a roller 150 mounted on a pin 151 secured to the switch. The switch, it will be noted, is mounted for reciprocal movement in a radial slot 152 in one end of the cam drum 135. The cam 148 is rotatably mounted on a stub shaft 153 mounted in the rear end of the cam drum radially inwardly of the pin 151 and is continuously rotated by a system of planetary gears. The planetary gear system includes a sun gear 154 which is rotatably mounted on the stub shaft 153 and planet gears 155 in mesh with the sun gear and driven thereby, the planet gears tracking on an internal gear ring 156 which is rigidly secured to the end of the drum.

Rotation of the drum about the stationary shaft 141 imparts movement to the sun gear 154. For this purpose, the shaft is splined as at 157 and in mesh with this splined portion of the shaft is an intermediate gear 158, rotation of which is communicated to a change gear 159, which is removably secured to the sun gear 154. The intermediate gear is rotatably mounted on a stud 160, which, as shown in Fig. 23, is threadably secured to a holder 161 mounted in an aperture 162 in the end of the cam drum. The change gear 159 is employed when the switch 148 is to be lowered at the conclusion of six passes or one pass in each roll groove.

When, however, it is desired to take two passes in each roll groove, it is necessary to double the number of revolutions of the cam drum, and, in order to permit the spindle to be returned to its initial position without reciprocation thereof, to maintain the switch 148 in its depressed condition for twice the number of revolutions of the cam drum which are employed in the normal or single-pass operation of the apparatus.

Figure 19:
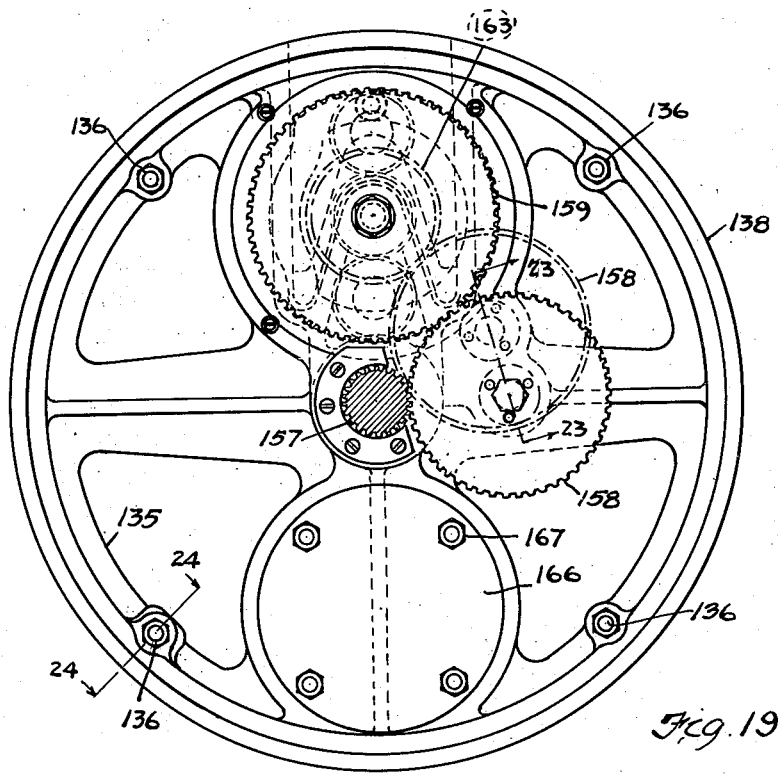
Fig. 19 is a transverse cross-sectional view of the spindle reciprocating mechanism, taken on the line 19—19 of Fig. 18.
Figure 20:
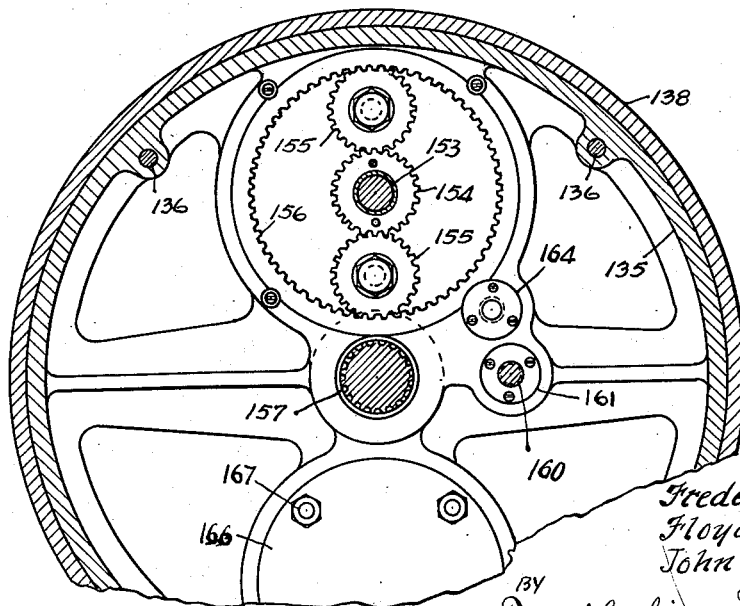
Fig. 20 is a transverse cross-sectional view of the spindle reciprocating mechanism, taken on the line 20—20 of Fig. 18.

For this purpose the change gear 159 is removed from the sun gear and is replaced by a smaller change gear 163, the position of which is diagrammatically indicated in Figs. 18 and 19. When this is done, the intermediate gear 158 and its stud 160 are removed from the holder 161 and secured to a holder 164 mounted in an aperture 165 in the end of the cam drum. This brings the gear 158 in driving engagement with the change gear 163, the position of the gear 158, when so moved, being indicated by the dotted lines in Fig. 19.

To counterbalance the switch operating mechanism, a counterweight 166 is provided and secured to the end of the cam drum, as by means of bolts 167.

The main drive shaft 168 of the apparatus is driven in unison with the rolls 12 and 13 of the roll-forging mill by means of mechanism which includes a gear 169 mounted on the shaft to which the gear 17 is secured, an endless chain 171, sprocket 172, and miter gears 173 and 174. The sprocket and miter gears are housed in a housing 175, which is mounted on a suitable bracket on the roll housing.

Rotation of the main drive shaft is communicated to the cross-drive shaft 60 through the medium of miter gears 176 and 62 which are housed in a housing 177 secured to the side wall of the housing 20.

Means have also been provided for loading or delivering to the chuck the billets or bar blanks to be forged, and for unloading or conveying the finished or roll-forged articles from the chuck. Each of these means is adapted to be driven in synchronism with the roll-forging mill and spindle operating mechanism so that all of the operations incidental to the use of the apparatus are automatic.

The loading and unloading means is best shown in Figs. 1, 2 and 32 to 36a, to which reference should now be made.

Mounted on the forward end of the housing 20 is a bracket shelf 180, upon which are supported bearings 181 and 182, in which are respectively journalled rock shafts 183 and 184.

Rock shaft 183 has keyed thereto but slidable longitudinally thereof a sleeve 185, which carries at the ends spaced pairs of uprights 186. Each pair of uprights forms a slideway for a guide 187, which operates to open and close a pair of tong jaws 188. The jaws 188 are pivoted as at 189 to the upper end of the uprights 186 and are pivoted intermediate their ends to links 190, which in turn are pivotally secured to a clevis 191. Clevis 191 is provided with a hollow depending stem 192 which extends through the guide 187 and has a lost motion connection with pin 193. Pin 193 extends transversely through the guide 187. A spring 194, inserted between the pin 193 and an adjustable plug 195 secured in the clevis 191, takes up the lost motion between the clevis and the pin, and permits the tong jaws 188 to accommodate themselves to variations in the size of the billet or bar blank to be forged.

The pin 193 is adapted to be raised or lowered to cause the tong jaws to be closed or opened, and this is accomplished by means of toggle links 196 and 197, these links being pivoted to each other and to side bars 198 as at 199. The links 197 are pivoted at their lower ends to the sleeve 185. The side bars 198 are actuated by means of links 200, which are pivoted intermediate their ends to the sleeve 185, and have a pin and slot connection with a yoke member 201, which encompasses the sleeve 185 and is movable longitudinally with respect to said sleeve. It will be apparent that upon reciprocation of the yoke 201, the links 200 will be rocked upon their central pivots to thereby cause the tong jaws to open or close. The yoke 201 is adapted to be reciprocated by a lever 202.

In addition to the tong jaw opening and closing mechanism, there is provided means for bringing the billet or bar blank to be forged into a position to be seized by the chuck on the spindle 28. This is accomplished by means of a lever 203, which upon movement in a clockwise direction, as viewed in Fig. 36, moves the entire tong mechanism to the right, so as to bring one end of the billet B, which is carried by the tong jaws against the stop member 72 of the spindle, in which position the billet is to be seized by the chuck. During this movement, the lever 202 remains stationary, a certain amount of lost motion between the lever 202 and the yoke 201 being provided for this purpose.

For the purpose of closing the movable jaw of the chuck, a lever 204 is provided. This lever is pivoted intermediate its ends to a support 205, extending upwardly from a lever 206. Lever 206 is keyed to the shaft 183 and is employed to rock this shaft so as to move the tong mechanism between the billet receiving position and the position in which the billet is aligned with the first pass of the mill. The lever 204 is movable about its pivot by means of a sleeve 207, which is slidably mounted on, but keyed to the shaft 183. The sleeve 207 is adapted to be reciprocated by means of a lever 208.

The unloading mechanism is mounted on rock shaft 184, and is shown most clearly in Figs. 1, 2, 33 and 34. It is substantially the same in construction as the loading mechanism, with the exception of the chuck closing lever 209, which is of slightly different contour than the corresponding lever 204 of the loading mechanism. In view of the similarity in construction of the loading and unloading mechanism, it is unnecessary to describe the construction of the latter, but it may be stated at this point that the unloading mechanism, as a whole, is movable between a position in which the finished forging carried thereby is aligned with the sixth pass of the mill to the position shown in Fig. 33, in which the finished forging is received by arms 210, mounted for pivotal movement on the bracket 180. For the unloading mechanism, levers 211, 212 and 213 are provided, these levers corresponding in function with the levers 202, 203 and 208 respectively. A lever 214 is provided for rocking the shaft 184.

The levers 202, 203, 208, 211, 212 and 213 are respectively operated by means of cams 215 to 220 inclusive, which are diagramatically illustrated in Fig. 43, these cams being rotated as a unit by the cam drum 40. Since all of the levers are operated in a similar manner, the operation of levers 202 and 211 only need be described. Lever 202 is operated by the cam 215 through the intermediary of a bell crank lever 221, connecting rod 222 (see Fig. 35), lever 223 and hollow shaft 224. The lever 221 is pivoted on a pin 225 mounted on a stationary frame 226, and is urged against the face of the cam 215 by means of a spring-pressed rod 226a. Lever 211 is similarly operated through the medium of a lever 227, connecting rod 228, link 229 and shaft 230. The shaft 230 extends through the shaft 224.

The levers 206 and 214 which are employed to rock the shafts 183 and 184 respectively, are likewise operated by grooved cams 231 and 232 which are rotated as a unit by the cam drum 40. Cam 231 rocks the lever 206 through the intermediary of lever 233, shaft 234, lever 235 and rod 236, and cam 232 rocks the lever 214 through the intermediary of lever 237, shaft 238, lever 239 and rod 240. The shafts 234 and 238 are journalled in suitable bearings supported by the frame 226.

Operation

Having now described in detail the construction of the apparatus, the function thereof will be best understood by a description of the various movements and operations which each billet or bar blank undergoes from the time it is loaded or delivered to the apparatus until the time it is unloaded or conveyed from the apparatus. Reference to Fig. 42 will be of assistance in following the various movements.

When it is desired that the billet be given a single pass in each roll pass, the cam drum 40 is rotated in a continuous manner, as previously described, and the spindle reciprocating mechanism is adjusted, as previously described, to produce a single reciprocation of the spindle for each pass.

Figure 33:
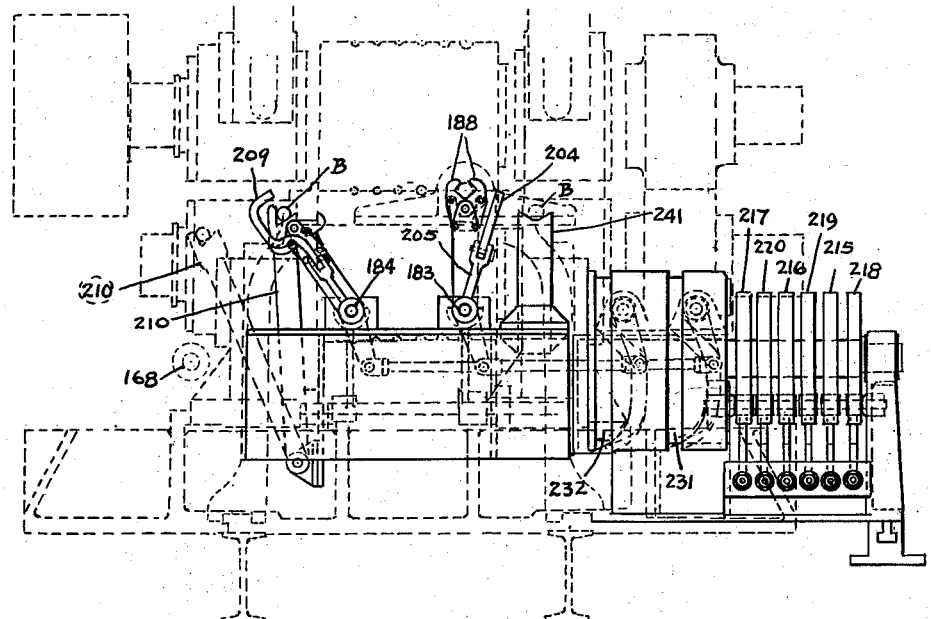
Fig. 33 is a rear elevation of the loading and unloading mechanism.
Figure 34:
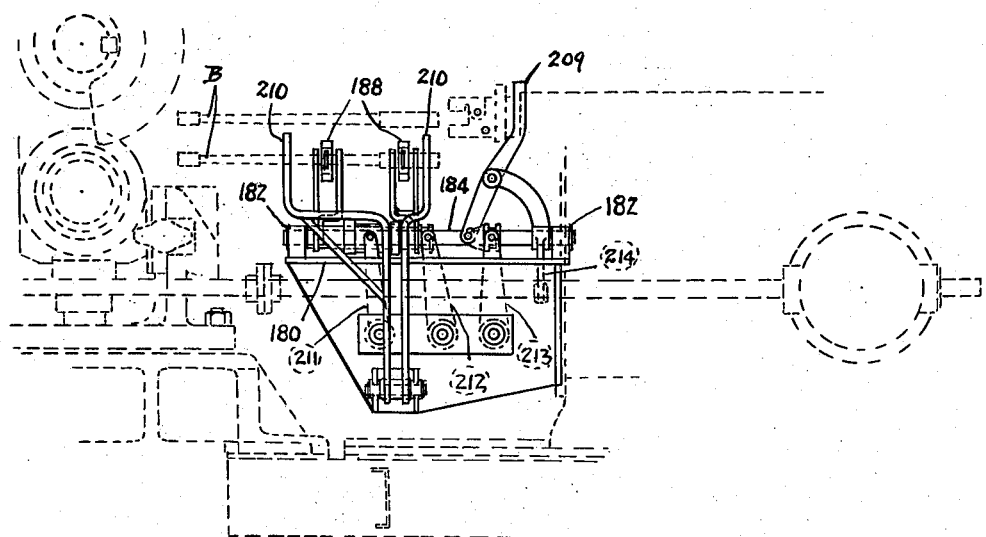
Fig. 34 is an elevation of the unloading side of the loading and unloading mechanism.
Figure 44:
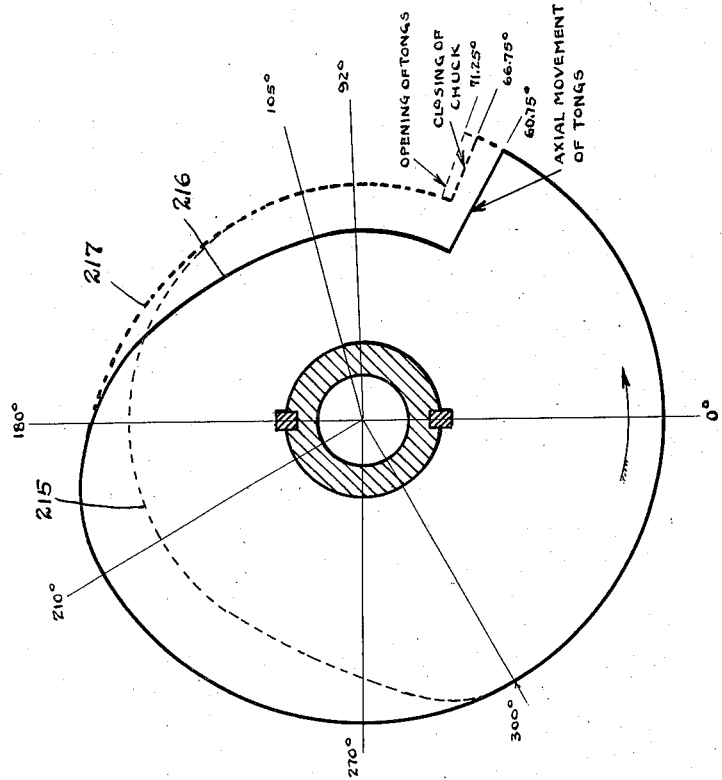
Fig. 44 is a view showing the contour of the loading cams and their relation to each other.
Figure 45:
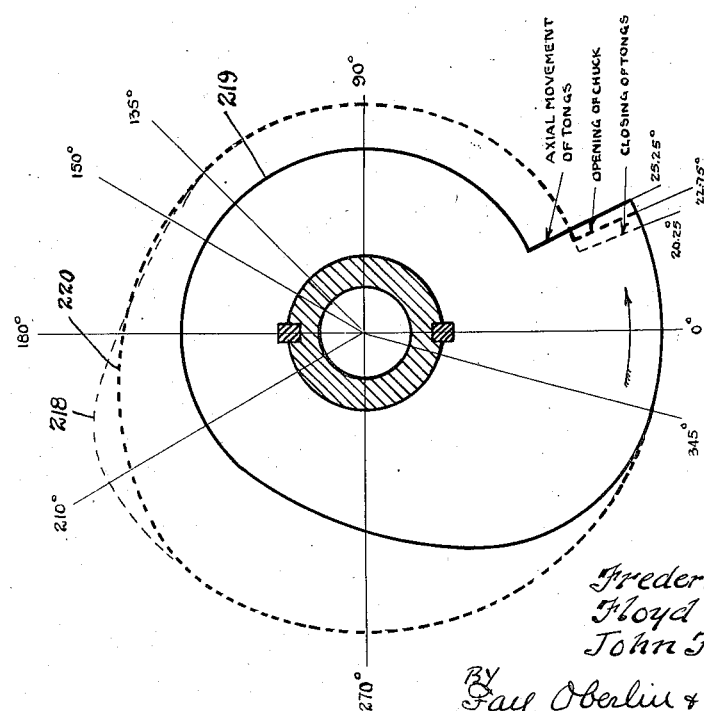
Fig. 45 is a view showing the contour of the unloading cams and their relation to each other.
Figure 48:
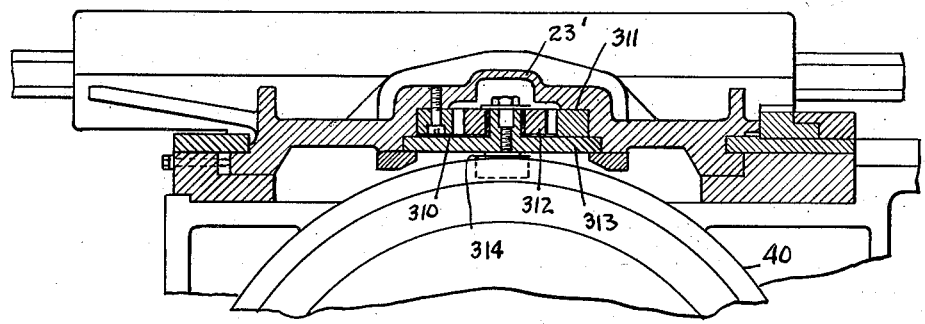
Fig. 48 is a fragmentary transverse cross-sectional view of the cross-slide unit, taken on the line 48—48 of Fig. 46.

With these adjustments made, the billets B, as indicated in Fig. 33, after being heated to a forging temperature in a suitable furnace (not shown) is deposited on a V-block 241, in which position it is ready to be grasped by the loading tongs. The loading tongs with the tong jaws open are then moved by lever 206 to pick up the billet, the tong jaws closing on the billet. The tongs are then returned to their vertical position, as shown in Fig. 33.

The tong mechanism is then moved rearwardly and is stopped when the end of the billet reaches the stop member 72 of the spindle. The chuck jaws are then closed on the end of the billet and the tong jaws opened. The tongs are then moved laterally towards the V-block 241 so as to be out of the path of movement of the billet.

The tongs are then moved axially to the position in which they are to pick up the next billet, and at the same time, the chuck operating lever is moved out of the path of the spindle.

During the aforesaid movements, the billet is being forged in the desired manner. After being forged, the article is unloaded or delivered from the chuck. The operations incidental to the unloading of the roll-forged article are substantially the reverse of the loading operations, and will be understood without further description from the diagram in Fig. 42.

When it is desired that the billet be given a double pass in each roll pass, the necessary adjustment, as hereinbefore described, is made in the operation of the cam drum 40, and the spindle reciprocating mechanism is also adjusted, as previously described, to produce two reciprocations of the spindle for each pass.

In Figs. 46 to 55 inclusive is shown a modified form of apparatus in which provision is made for handling billets which are too long to be handled by the apparatus previously described.

For the purpose of handling such extremely long billets, without modifying the timing of the loading and unloading operations, it becomes necessary to increase the stroke of the spindle.

Figure 51:
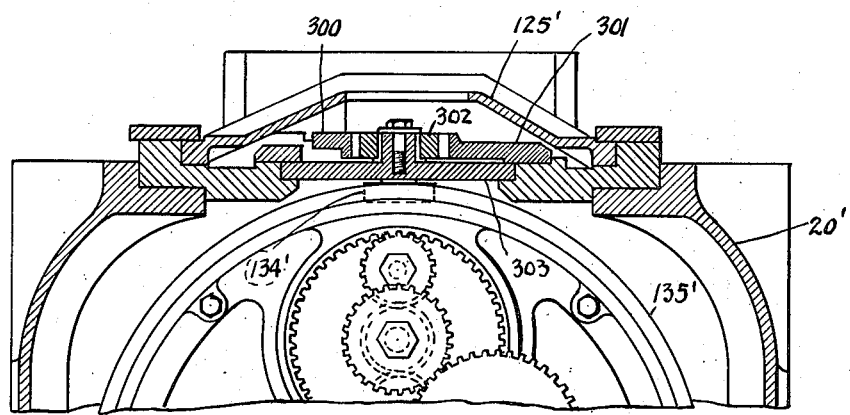
Fig. 51 is a transverse cross-sectional view of the apparatus, taken on the line 51—51 of Fig. 46.

The reciprocation of the spindle in such case is effected by the mechanism shown most clearly in Figs. 46, 47 and 51.

The rear end of the spindle, in this case, is secured to a carriage 125' which has rigidly secured thereto a rack 300. Secured to the housing 20', opposite the rack 300 is a stationary rack 301. The rack 300 and 301 are engaged by a pinion 302, which is rotatably mounted adjacent one end of a plate 303. Plate 303 is mounted for reciprocal longitudinal movement in suitable slideways in the housing 20', and carries at its opposite end a cam roller 134'. The cam roller 134' is actuated by the cylindrical cam drum 135'. It will be apparent from this construction, that the stroke of the carriage 125 will be considerably increased by virtue of the fact that its movement will be derived from the engagement of the movable rack 300 by a rotating pinion, and that a cam drum of smaller diameter than would otherwise be required, can be employed. This is a distinct advantage.

The transverse movement of the spindle is effected by the mechanism shown most clearly in Figs. 46, 48, 49 and 50.

The spindle carriage 23', in this case, has rigidly secured thereto a rack 310. Secured to the housing 20', opposite the rack 310, is a rack 311. The racks 310 and 311 are engaged by a pinion 312, which is rotatably mounted adjacent one end of a plate 313. Plate 313 is mounted for transverse movement in suitable slideways in the housing 20', and carries adjacent its opposite end a cam roller 314, which is adapted to be actuated by the cam drum 40. It will be apparent from this construction that the speed of movement of the spindle carriage will be increased so that the spindle carriage may be returned to its initial position more quickly than in the previously described form of the apparatus.

The rack 311 may be longitudinally adjusted by means of a screw member 315, which is mounted on the housing 20' and is adapted for engagement by a wrench or other operating device.

The entire housing 20' may, when desired, be moved with respect to the roll-forging mill, this being effected by mechanism shown in Figs. 46 and 47. Such mechanism includes a screw 320 which is secured to the housing 20', a transverse member 321 which is secured to the rails 18 and 19, and through which the screw 320 extends, a screw actuating nut 322, and a bar 323 for rotating the nut 322.

For the purpose of cushioning the spindle reciprocating carriage as it nears the limits of its forward and rearward movement, there is provided a hydraulic shock absorber, the detailed construction of which is illustrated in Figs. 46 and 52 to 55 inclusive.

The shock absorber comprises a pair of oil tanks 350, each of which is secured, as by screw bolts 351, to a base plate 352. Each tank is provided with a cover 353, which is removably secured to the tank and is provided with a plug 354, whereby the tanks may be filled with oil.

The tank 350 is provided with an inwardly extending wall which divides the tank into two compartments, an upper compartment 356, and a lower cylindrical chamber 357. Disposed within the chamber 357 is a piston 358, which is mounted on one end of a piston rod 359, the rod 359 passing through a stuffing box 360, which closes one end of the chamber. The chamber 357 communicates at each end with the compartment 356 through passageways 361, in each of which is disposed a disk 362 provided with a small aperture 363. This aperture 363, by virtue of its small size, allows the oil to pass outwardly into the compartment 356 so slowly that it cushions the movement of the piston 358.

A ball inlet valve 364 is also provided at each end of the chamber 357, to permit the oil to flow back into the chamber as the piston recedes from the valve.

To avoid excessive oil pressures in the chamber 357, each end thereof is further provided with a relief valve. Each valve comprises a casing 365 having a passageway 366, which is in communication with the chamber 357 and is normally closed by a ball 367. The ball is maintained in closed position by means of a spring pressed plunger 368, the pressure on the ball being adjustably controlled by a threaded plug 369. In the event that the oil pressure within the chamber 357 becomes too high, the ball 367 is lifted by the oil, and the oil flows upwardly into the casing 365, thence laterally outwardly through apertures 370 and into the compartment 356.

The rods 359 are supported at their forward ends in guide blocks 371 and pass through brackets 372 which are secured to the sides of the spindle reciprocating carriage 125'.

The brackets, in their forward movement along the rods 359, come into engagement with sleeves 373, which are affixed to the rods and thus cause the pistons 358 to move forwardly, the forward movement of the pistons being cushioned in a manner which will be readily understood.

In their rearward movement, the brackets 372 abut the collars 374, which are affixed to the rod 359, thus cushioning the carriage 125' in its rearward movement.

It will be obvious that the use of apparatus such as has been described will eliminate the human or personal element in the manufacture of various types of roll-forged articles and will insure a uniformity in the articles which can be matched only by skilled labor of the higher type. It will also be apparent that the use of the apparatus in conjunction with a roll-forging mill of the character described will greatly increase the speed of forging of each article to such an extent as to render reheating of the billet or bar blank at any stage in the operations unnecessary.

Other modes of applying the principle of our invention may be employed instead of the one explained, change being made as regards the product and means herein disclosed, provided the step or steps stated by any of the following claims or the equivalent of such stated steps be employed.

We therefore particularly point out and distinctly claim as our invention:

1. In combination with a mill for roll-forging articles from blanks, said mill including a pair of rolls providing a plurality of spaced passes, means for chucking a blank to be forged, means for indexing said blank with each of said passes in succession, and means for advancing said blank more than once into each of said passes, said last-named means being driven by power during each blank-advancing movement thereof, and all of said means operating in synchronism and acting automatically and independently of any act on the part of an operator.

2. In combination with a mill for roll-forging articles from blanks, said mill including a pair of rolls providing a plurality of passes, a spindle provided with a blank holding chuck arranged to be successively aligned with each of said passes, a carriage guided for reciprocal movement towards and away from said mill, said carriage having means engaging the rear end of the spindle whereby to reciprocate the spindle, and means for cushioning the movement of said carriage as it approaches the forward and rearward limits of its movement.

3. In roll-forging apparatus, a housing, a spindle mounted thereon for movement transversely of said housing, a chuck carried by said spindle, tong mechanism for delivering to said chuck a bar blank to be forged, and tong mechanism for removing said bar blank from said chuck after said blank has been forged, each of said tong mechanisms being movable in arcuate paths transverse to the axis of said spindle.

4. In combination with a mill for roll-forging articles from blanks, said mill including a pair of rolls providing a plurality of spaced passes, a blank-supporting carriage mounted for movement along said rolls, and a cam for so moving said carriage, said cam being rotatable about an axis parallel with the axes of said rolls.

5. In roll-forging apparatus, a mill for roll-forging articles from bar blanks, a housing in advance of said mill, a spindle reciprocating carriage mounted on said housing, and means for moving said carriage towards and away from said mill, said means comprising a rotatable cam, a plate slidably mounted on said housing, a cam roller mounted on said plate and in engagement with said cam, a pinion on said plate, a rack on said carriage and a stationary rack on said housing, said pinion engaging with each of said racks.

6. In roll-forging apparatus, a mill for roll-forging articles from bar blanks, a housing in advance of said mill, a spindle carriage mounted for movement transversely of said housing, and means for traversing said carriage across said housing, said means comprising a rotatable cam, a plate slidably mounted on said housing, a cam roller mounted on said plate and in engagement with said cam, a pinion on said plate, a rack on said carriage and a stationary rack on said housing, said pinion engaging with each of said rocks.

7. In roll-forging apparatus, a housing, a spindle carriage, and means for traversing said carriage across said housing, said means comprising a cylindrical cam and means for selectively rotating said cam in a continuous or intermittent manner.

8. In combination with a mill for roll-forging articles from blanks, said mill including a pair of rolls providing a plurality of spaced passes, means for indexing a blank to be forced with each of said passes in succession, said means comprising a carriage arranged for movement transversely of said passes, a blank-carrying spindle mounted on said carriage and a rotatable cylindrical drum having cam means for intermittently moving said carriage; and means operating in synchronism with said blank-indexing means for automatically feeding the blank into each of the passes after being indexed therewith, said means comprising a second carriage and a rotatable cylindrical drum having cam means for positively reciprocating said last-named carriage.

9. In combination with a mill for roll-forging articles from blanks, said mill including a pair of rolls providing a plurality of spaced passes, means for chucking a blank to be forced, and means for indexing said blank with each of said passes in succession, said last-named means comprising a carriage for supporting said chucking means and arranged for movement transversely of said passes, and a rotatable cylindrical drum having cam means for intermittently moving said carriage transversely of said passes.

10. In combination with a mill for roll-forging bar blanks, said mill including a pair of cooperating dies providing a plurality of passes, a spindle provided with a blank-holding chuck arranged to be successively aligned with each of said passes, a carriage guided for reciprocal movements towards and away from said mill, said carriage having means to receive the rear end of the spindle whereby to reciprocate the spindle, and a rotatable cylindrical drum having cam means operative to positively reciprocate said carriage transversely of said passes.

11. In combination with a mill for roll-forging bar blanks, said mill including a pair of cooperating dies providing a plurality of passes, a spindle provided with a blank-holding chuck arranged to be successively aligned with each of said passes, a carriage guided for movement transversely of said passes, said carriage supporting said spindle, and a rotatable cylindrical drum having cam means for intermittently moving said carriage transversely of said passes.

12. In combination with a mill for roll-forging articles from blanks, said mill including a pair of rolls providing a plurality of spaced passes, a blank-supporting carriage mounted for movement along said rolls, and a drum having a cam groove in its peripheral surface for intermittently moving said carriage, said drum being rotatable about an axle parallel with the axes of said rolls.

13. In combination with a mill for roll-forging bar blanks, said mill including a pair of rolls providing a plurality of spaced passes, a spindle provided with a blank-holding chuck arranged to be successively aligned with each of said passes automatically and independently of any act on the part of an operator, non-yieldable means for moving said spindle towards each pass of the rolls whereby a blank held by said chuck is entered between the rolls for forging thereby, and means for delaying the spindle sufficiently at each pass alignment to permit more than one movement of the spindle towards the rolls and each pass by said non-yieldable means.

14. In combination with a mill for roll-forging bar blanks, said mill including a pair of rolls providing a plurality of spaced passes, a spindle provided with a blank-holding chuck arranged to be successively aligned with each of said passes automatically and independently of any act on the part of an operator, means for moving said spindle towards the rolls whereby a blank held by said chuck is entered between the rolls for forging thereby, said means being operative to move said spindle away from the rolls during the forging operation, and means for delaying the spindle sufficiently at each pass alignment to permit more than one movement of the spindle towards the rolls and each pass by said first-named means.

15. In combination with a mill for roll-forging articles from blanks, said mill including a pair of rolls, providing a plurality of passes spaced axially of said rolls, a spindle, means for indexing said spindle with each of said passes in succession, and a rotatable cam drum for positively reciprocating said spindle with respect to said mill irrespective of the pass with which the spindle is indexed.

16. In combination with a mill for roll-forging articles from blanks, said mill including a pair of rolls providing a plurality of passes spaced axially of said rolls, a blank holding member, means for indexing said blank holding member with each of said passes in succession, and a cam for reciprocating said blank holding member with respect to said mill irrespective of the index position of said blank-holding member, said cam being rotatable about an axis parallel with the axis of the blank-holding member.

17. In combination with a mill for roll-forging articles from blanks, said mill including a pair of rolls providing a plurality of passes spaced axially of said rolls, a spindle mounted for reciprocal movement with respect to said mill, means for indexing said spindle with each of said passes in succession, a carriage for reciprocating said spindle with respect to said mill irrespective of the pass with which the spindle is indexed, and a rotatable drum having cam means for positively reciprocating said carriage.

18. In combination with a mill for roll-forging articles from blanks, said mill including a pair of rolls providing a plurality of passes spaced axially of said rolls, a blank-holding member mounted for reciprocal movement with respect to said mill, means for indexing said spindle with each of said passes in succession, and a drum having cam means for positively reciprocating said blank-holding member irrespective of the index position of said member, said drum being rotatable about an axis parallel with the axis of the blank-holding member.

19. In roll-forging apparatus, a carriage, cam means operative when rotated to reciprocate said carriage and means associated with said cam for delaying reciprocation of said carriage without stopping rotation of the cam.

20. In apparatus of the character described, a spindle provided with a blank-holding chuck arranged to be successively positioned at a plurality of stations spaced transversely of said apparatus, automatically and independently of any act on the part of an operator, and means for positively moving said spindle forwardly of said apparatus more than once at each of said stations.

21. In an apparatus of the character described, a spindle provided with a blank holding chuck arranged to be successively positioned at a plurality of stations spaced transversely of said apparatus, automatically and independently of any act on the part of an operator, and means for positively reciprocating said spindle more than once at each of said stations.

22. In combination with a mill for roll-forging bar blanks, said mill including a pair of rolls providing a plurality of spaced passes, a spindle provided with a blank-holding chuck arranged to be successively aligned with each of said passes automatically and independently of any act on the part of an operator, and non-yieldable means for moving said spindle more than once towards each pass of the rolls, whereby a blank held by said chuck is entered between the rolls for plural forgings by each pass of the rolls.

23. In combination with a mill for roll-forging bar blanks, said mill including a pair of rolls providing a plurality of spaced passes, a spindle provided with a blank-holding chuck arranged to be successively aligned with each of said passes automatically and independently of any act on the part of an operator, and means for moving said spindle more than once towards each pass of the rolls, whereby a blank held by said chuck is entered between the rolls for plural forgings by each pass of the rolls, said means being operative to move said spindle away from the rolls during each forging.

FREDERICK N. ROSS.
FLOYD L. SCOUTTEN.
JOHN F. FERM.